(12) United States Patent
Baker et al.

(10) Patent No.: US 12,320,898 B2
(45) Date of Patent: *Jun. 3, 2025

(54) METHOD AND SYSTEM FOR VEHICLE ODOMETRY USING COHERENT RANGE DOPPLER OPTICAL SENSORS

(71) Applicant: Aurora Operations, Inc., Pittsburgh, PA (US)

(72) Inventors: Devlin Baker, Bozeman, MT (US); James Curry, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 807 days.

This patent is subject to a terminal disclaimer.

(21) Appl. No.: 17/506,397

(22) Filed: Oct. 20, 2021

(65) Prior Publication Data

US 2022/0043151 A1 Feb. 10, 2022

Related U.S. Application Data

(63) Continuation of application No. 16/906,835, filed on Jun. 19, 2020, now Pat. No. 11,181,640.

(60) Provisional application No. 62/864,877, filed on Jun. 21, 2019.

(51) Int. Cl.
*G01S 17/58* (2006.01)
*B60W 40/105* (2012.01)
*G01S 7/48* (2006.01)
*G01S 7/487* (2006.01)
(Continued)

(52) U.S. Cl.
CPC .......... *G01S 17/58* (2013.01); *B60W 40/105* (2013.01); *G01S 7/4804* (2013.01); *G01S 7/487* (2013.01); *G01S 7/4912* (2013.01); *G01S 17/88* (2013.01); *B60W 2420/408* (2024.01)

(58) Field of Classification Search
None
See application file for complete search history.

(56) References Cited

U.S. PATENT DOCUMENTS 10,345,437 B1 * 7/2019 Russell ................... G01S 17/86
11,181,640 B2 * 11/2021 Baker ...................... G01S 7/487
2017/0299697 A1 10/2017 Swanson

FOREIGN PATENT DOCUMENTS

WO WO-2018/107237 A1 6/2018

OTHER PUBLICATIONS

Wehr, Aloysius, and Uwe Lohr. "Airborne laser scanning-an introduction and overview." ISPRS Journal of photogrammetry and remote sensing 54.2-3 (1999): 68-82. (Year: 1999).*

(Continued)

*Primary Examiner* — Luke D Ratcliffe
(74) *Attorney, Agent, or Firm* — Dority & Manning, P.A.

(57) ABSTRACT

A system and method for vehicle odometry using coherent range Doppler optical sensors. The system and method includes operating a Doppler light detection and ranging (LIDAR) system to collect raw point cloud data that indicates for a point a plurality of dimensions, wherein a dimension of the plurality of dimensions includes an inclination angle, an azimuthal angle, a range, or a relative speed between the point and the LIDAR system; determining a corrected velocity vector for the Doppler LIDAR system based on the raw point cloud data; and producing revised point cloud data that is corrected for the velocity of the Doppler LIDAR system.

20 Claims, 26 Drawing Sheets

(51) Int. Cl.
   *G01S 7/4912*   (2020.01)
   *G01S 17/88*    (2006.01)

(56) References Cited

OTHER PUBLICATIONS

Non-Final Office Action on U.S. Appl. No. 16/906,835 dated Dec. 3, 2020 (7 pages).
Notice of Allowance on U.S. Appl. No. 16/906,835 dated Jul. 30, 2021 (5 pages).
Office Action on U.S. Appl. No. 16/906,835 dated Mar. 23, 2021 (9 pages).
Zhang, J. et al., "Visual-lidar odometry and mapping: Low-drift, robust, and fast.", 2015 IEEE International Conference on Robotics and Automation (ICRA), IEEE, 2015.

* cited by examiner

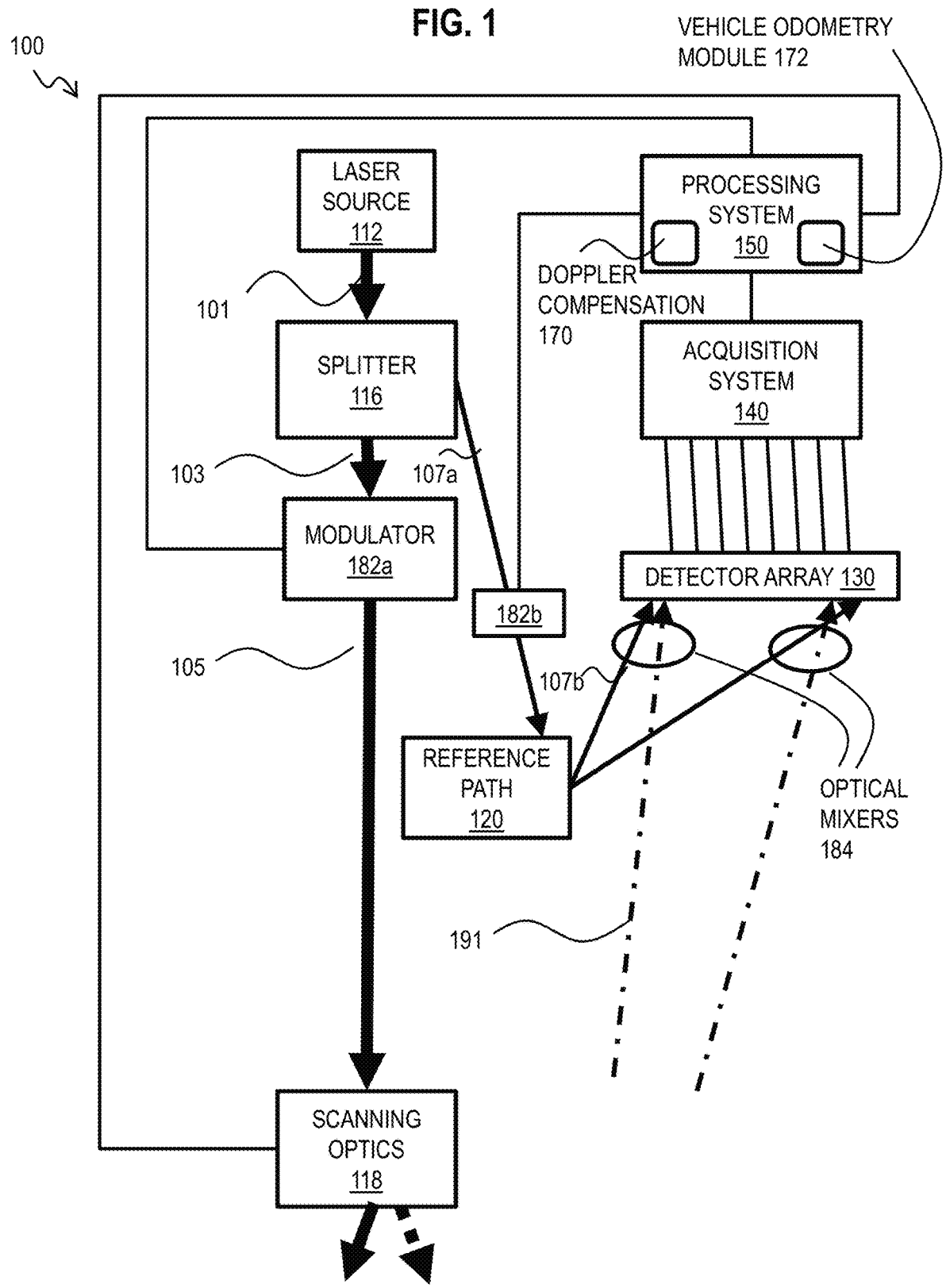

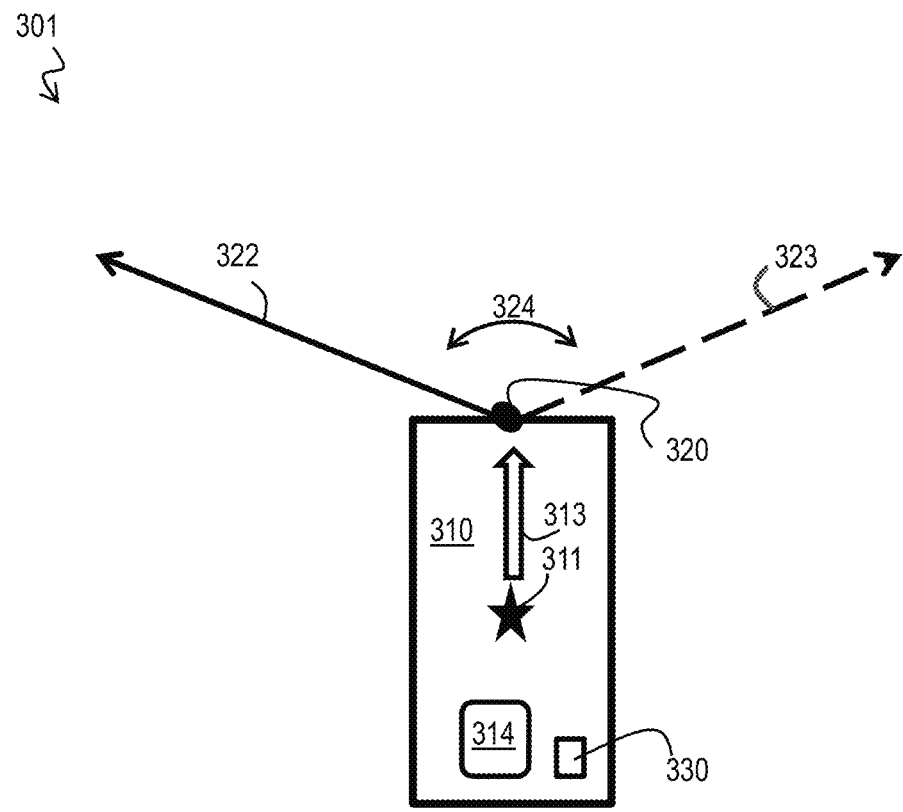
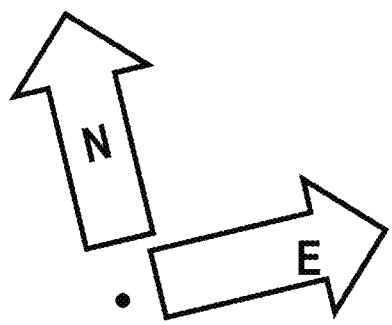
FIG. 3A

300D

operating a Doppler light detection and ranging (LIDAR) system to collect raw point cloud data that indicates for a point at least a plurality of dimensions, wherein a dimension of the plurality of dimensions includes an inclination angle, an azimuthal angle, a range, or a relative speed between the point and the LIDAR system
302D determining a corrected velocity vector for the Doppler LIDAR system based on the raw point cloud data
304D producing revised point cloud data that is corrected for the velocity of the Doppler LIDAR system
306D

FIG. 3D

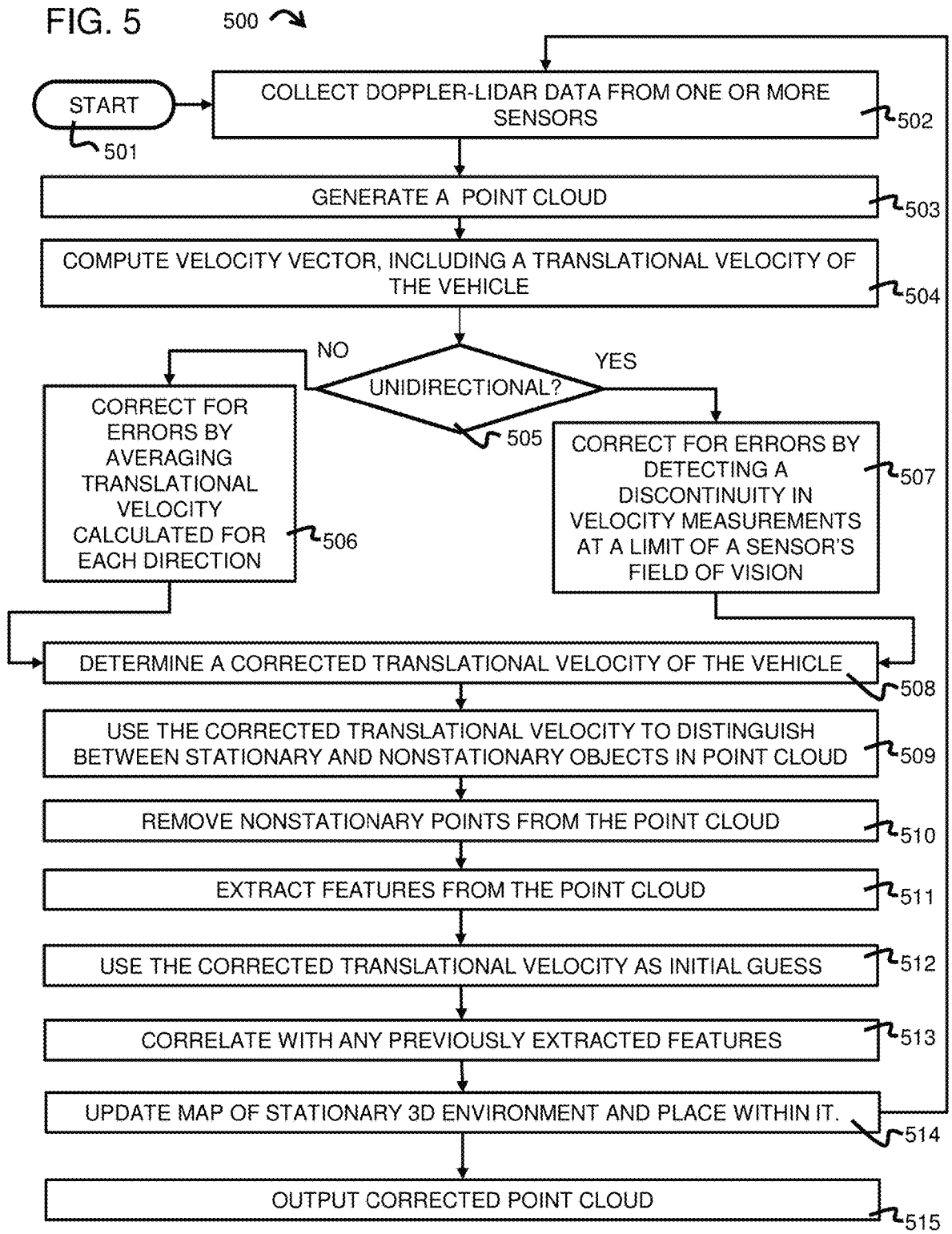

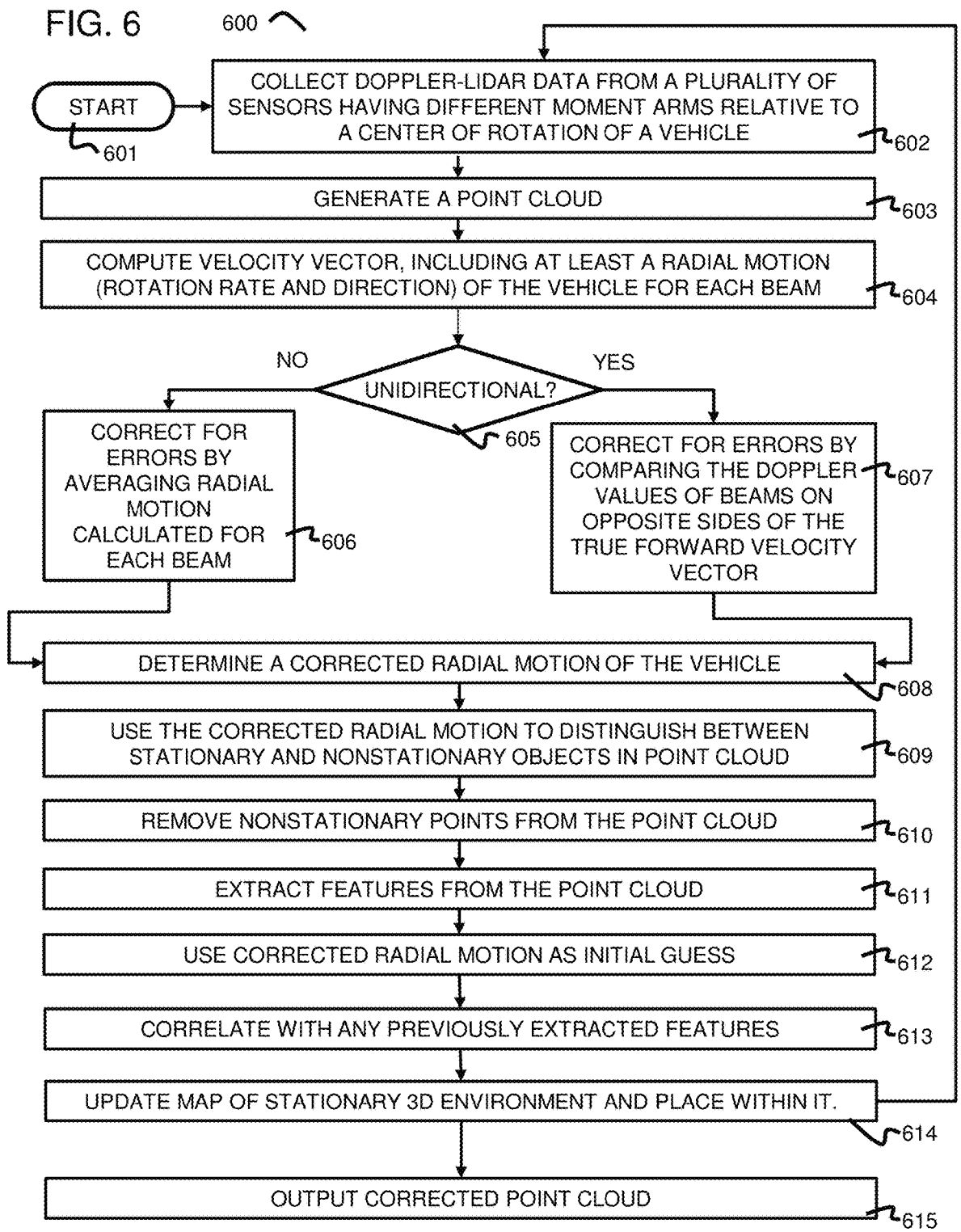

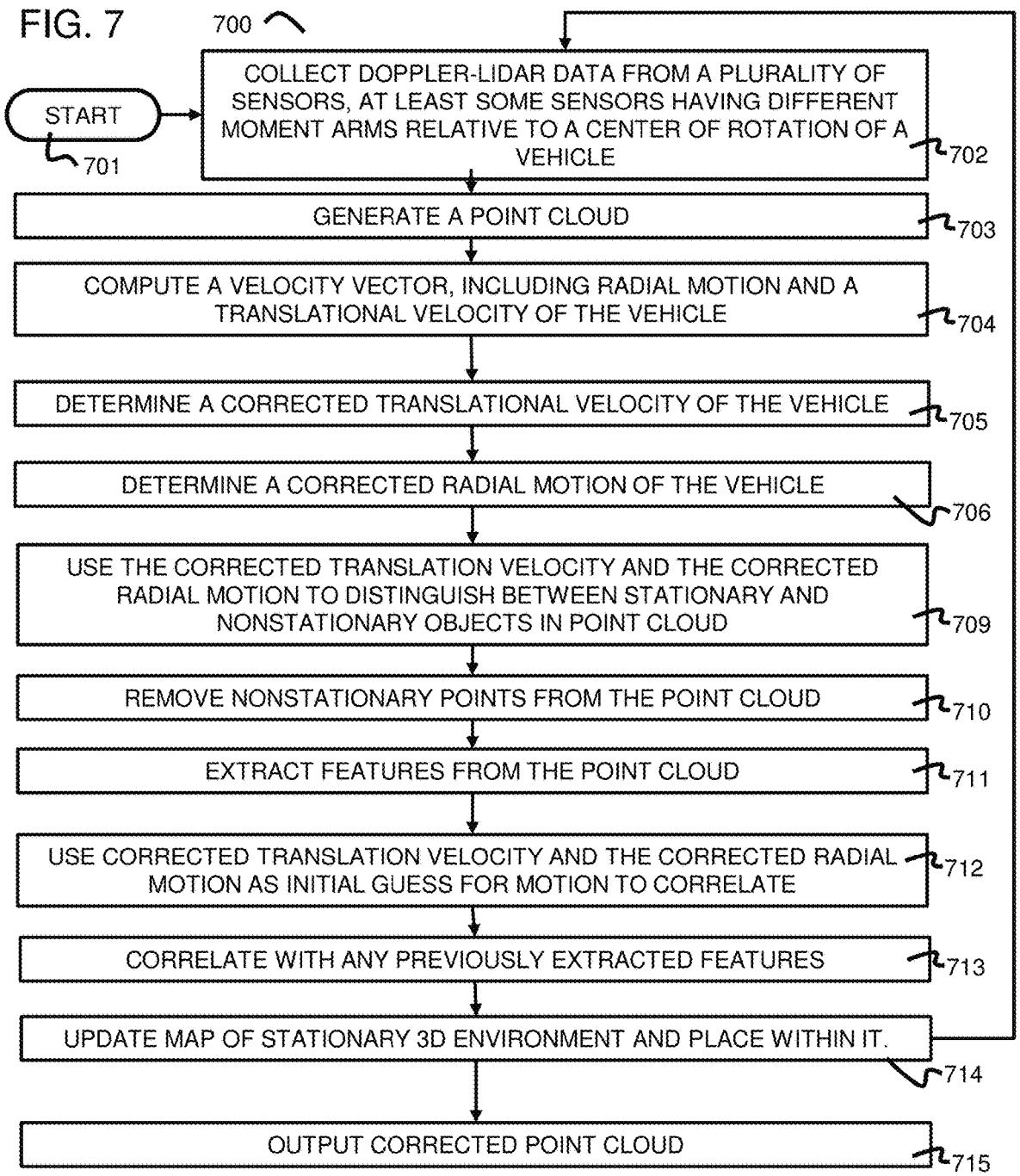

METHOD AND SYSTEM FOR VEHICLE ODOMETRY USING COHERENT RANGE DOPPLER OPTICAL SENSORS

CROSS-REFERENCE TO RELATED APPLICATIONS

This application is a continuation of U.S. patent application Ser. No. 16/906,835, filed Jun. 19, 2020, which claims the benefit of and priority to U.S. Provisional Patent Application No. 62/864,877, filed Jun. 21, 2019. The entire disclosure of U.S. patent application Ser. No. 16/906,835 and U.S. Provisional Patent Application No. 62/864,877 is incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and method for vehicle odometry using coherent range Doppler optical sensors to support the operation of a vehicle.

One implementation disclosed herein is directed to a method including collecting, by a light detection and ranging (LIDAR) system of a vehicle, point cloud data. In some implementations, the method includes producing, by the LIDAR system based on the point cloud data, a velocity vector for the vehicle. In some implementations, the method includes determining, by the LIDAR system, whether a scan by the LIDAR system is unidirectional or bidirectional. In some implementations, the method includes in response to determining that the scan is bidirectional, revising, by the LIDAR system, the velocity vector and the point cloud data based on an average velocity in a scan direction. In some implementations, the method includes in response to determining that the scan is unidirectional, revising, by the LIDAR system, the velocity vector and the point cloud data based on a discontinuity in velocity measurements.

In another aspect, the present disclosure is directed to a non-transitory computer-readable storage medium storing instructions which, when executed by one or more processors, cause the one or more processors to perform operations including causing a light detection and ranging (LIDAR) system of a vehicle to collect point cloud data. In some implementations, the instructions which, when executed by one or more processors, cause the one or more processors to produce, based on the point cloud data, a velocity vector for the vehicle. In some implementations, the instructions which, when executed by one or more processors, cause the one or more processors to determine whether a scan by the LIDAR system is unidirectional or bidirectional. In some implementations, the instructions which, when executed by one or more processors, cause the one or more processors to, in response to determining that the scan is bidirectional, revise the velocity vector and the point cloud data based on an average velocity in a scan direction. In some implementations, the instructions which, when executed by one or more processors, cause the one or more processors to, in response to determining that the scan is unidirectional, revise the velocity vector and the point cloud data based on a discontinuity in velocity measurements.

In another aspect, the present disclosure is directed to a light detection and ranging (LIDAR) system including one or more processors. In some implementations, the one or more processors are configured to collect point cloud data. In some implementations, the one or more processors are configured to produce, based on the point cloud data, a velocity vector for the vehicle. In some implementations, the one or more processors are configured to determine whether a scan by the LIDAR system is unidirectional or bidirectional. In some implementations, the one or more processors are configured to in response to determining that the scan is bidirectional, revise the velocity vector and the point cloud data based on an average velocity in a scan direction. In some implementations, the one or more processors are configured to in response to determining that the scan is unidirectional, revise the velocity vector and the point cloud data based on a discontinuity in velocity measurements.

One implementation disclosed herein is directed to a method for vehicle odometry using coherent range Doppler optical sensors to support the operation of a vehicle. In some implementations, the method includes operating a Doppler light detection and ranging (LIDAR) system to collect raw point cloud data that indicates for a point a plurality of dimensions. In some implementations, a dimension of the plurality of dimensions includes an inclination angle, an azimuthal angle, a range, or a relative speed between the point and the LIDAR system. In some implementations, the method includes determining a corrected velocity vector for the Doppler LIDAR system based on the raw point cloud data. In some implementations, the method includes producing revised point cloud data that is corrected for the velocity of the Doppler LIDAR system.

In some implementations, the corrected velocity vector is a translation velocity vector or a rotational velocity vector. In some implementations, the corrected velocity vector comprises translational velocity along and rotational velocity about an axis.

In some implementations, the method includes extracting, from the revised point cloud data, stationary features or moving features. In some implementations, the method includes correlating the stationary features from the revised point cloud data with a set of previously-stored stationary features. In some implementations, the Doppler LIDAR system comprises a plurality of Doppler LIDAR sensors mounted to a vehicle, and the method further includes storing configuration data that indicates a moment arm relative to a center of rotation of the vehicle for a sensor of the plurality of Doppler LIDAR sensors.

In some implementations, the method includes determining the moment arm relative to the center of rotation of the vehicle for the sensor of the plurality of Doppler LIDAR sensors based on the raw point cloud data.

In another aspect, the present disclosure is directed to a non-transitory computer-readable storage medium storing instructions which, when executed by one or more processors, cause the one or more processors to perform operations including operating a Doppler light detection and ranging (LIDAR) system to collect point raw cloud data that indicates for a point a plurality of dimensions, wherein a dimension of the plurality of dimensions includes an inclination angle, an azimuthal angle, a range, or a relative speed between the point and the LIDAR system. In some implementations, the instructions which, when executed by one or more processors, cause the one or more processors to perform operations including determining a corrected velocity vector for the Doppler LIDAR system based on the raw point cloud data. In some implementations, the instructions which, when executed by one or more processors, cause the one or more processors to perform operations including producing revised point cloud data that is corrected for the velocity of the Doppler LIDAR system.

In some implementations, the corrected velocity vector is a translation velocity vector or a rotational velocity vector. In some implementations, the corrected velocity vector comprises translational velocity along and rotational velocity about an axis. In some implementations, the instructions, when executed by the one or more processors, further cause the one or more processors to extract stationary features from the revised point cloud data. In some implementations, the instructions, when executed by the one or more processors, further cause the one or more processors to extract moving features from the revised point cloud data.

In some implementations, the Doppler LIDAR system comprises a plurality of Doppler LIDAR sensors mounted to a vehicle, and wherein the instructions, when executed by the one or more processors, further cause the one or more processors to store configuration data that indicates a moment arm relative to a center of rotation of the vehicle for a sensor of the plurality of Doppler LIDAR sensors. In some implementations, the instructions, when executed by the one or more processors, further cause the one or more processors to determine the moment arm relative to the center of rotation of the vehicle for a sensor of the plurality of Doppler LIDAR sensors based on the raw cloud point cloud data.

In another aspect, the present disclosure is directed to a LIDAR system including one or more processors configured to operate the high resolution Doppler LIDAR system to collect raw point cloud data that indicates for a point a plurality of dimensions, wherein a dimension of the plurality of dimensions include an inclination angle, an azimuthal angle, a range, or a relative speed between the point and the LIDAR system. In some implementations, the one or more processors are configured to determine a corrected velocity vector for the high resolution Doppler LIDAR system based on the raw point cloud data. In some implementations, the one or more processors are configured to produce revised point cloud data that is corrected for the velocity of the Doppler LIDAR system. In some implementations, the corrected velocity vector is a translation velocity vector.

In some implementations, the corrected velocity vector is a rotational velocity vector or a translational velocity along and rotational velocity about an axis. In some implementations, the one or more processors are further configured to extract, from the revised point cloud data, stationary features or moving features. In some implementations, the Doppler LIDAR system comprises a plurality of Doppler LIDAR sensors, and wherein the one or more processors are further configured store configuration data that indicates a moment arm relative to a center of rotation of the vehicle for a sensor of the plurality of Doppler LIDAR sensors. In some implementations, the one or more processors are further configured to determine the moment arm relative to the center of rotation of the vehicle for the sensor of the plurality of Doppler LIDAR sensors based on the raw cloud point cloud data.

Still other aspects, features, and advantages are readily apparent from the following detailed description, simply by illustrating a number of particular implementations, including the best mode contemplated for carrying out the implementations described in the present disclosure. Other implementations are also capable of other and different features and advantages, and their several details can be modified in various obvious respects, all without departing from the spirit and scope of the implementations described in the present disclosure. Accordingly, the drawings and description are to be regarded as illustrative in nature, and not as restrictive.

BRIEF DESCRIPTION OF THE DRAWINGS

Implementations are illustrated by way of example, and not by way of limitation, in the figures of the accompanying drawings in which like reference numerals refer to similar elements and in which:

FIG. 1 is a block diagram that illustrates example components of a high resolution (hi-res) Doppler LIDAR system, according to an implementation;

FIG. 3A is a block diagram that illustrates an example system that includes at least one hi-res Doppler LIDAR system mounted on a vehicle, according to an implementation;

FIG. 3D is a flow chart that illustrates an example method for vehicle odometry using coherent range Doppler optical sensors, according to an implementation;

FIG. 5 is a flow chart that illustrates an example method for using data from one or more Doppler LIDAR sensors in an automatic vehicle setting to compute and to correct a translational velocity vector of the vehicle and to output a corrected point cloud based on the translation velocity vector, according to an implementation;

FIG. 6 is a flow chart that illustrates an example method for using data from a plurality of Doppler LIDAR sensors in an automatic vehicle setting to compute and to correct a rotational velocity vector of the vehicle and to output a corrected point cloud based on the rotational velocity vector, according to an implementation;

FIG. 7 is a flow chart that illustrates an example method for using data from a plurality of Doppler LIDAR sensors in an automatic vehicle setting to compute and to correct a velocity vector, including both translational velocity and a rotational velocity, of the vehicle and to output a corrected point cloud based on the velocity vector, according to an implementation;

DETAILED DESCRIPTION

Figure 2A:
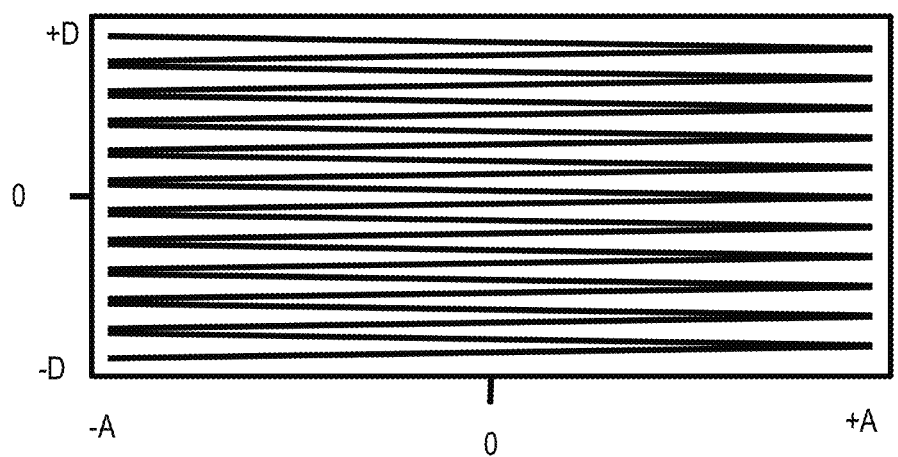
FIG. 2A is a block diagram that illustrates a saw tooth scan pattern for a hi-res Doppler system, used in some implementations.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work shows arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications WO2018/160240 and WO/2018/144853 based on Patent Cooperation Treaty (PCT) patent applications PCT/US2017/062703 and PCT/US2018/016632, respectively.

However, the conventional LIDAR systems implementing the aforementioned approaches to Doppler shift detection often struggle with consistently resolving Doppler detection ambiguity. For this reason, there is a long-felt need in resolving detection ambiguity in a manner that improves the capability of a LIDAR system to compensate for Doppler Effects in optical range measurements.

Furthermore, autonomous navigation system often depend on the cooperation of a multitude of sensors to reliably achieve desired results. For example, modern autonomous vehicles often combine cameras, radars, and LIDAR systems for spatial awareness. These systems may further employ Global Positioning System (GPS) solutions, inertial measurement units, and odometer to generate location, velocity and heading within a global coordinate system. This is sometimes referred to as an inertial navigation system (INS) "solution." The navigation task represents an intricate interplay between the proposed motion plan (as directed by the INS and mapping software) and the avoidance of dynamic obstacles (as informed by the cameras, radar, and LIDAR systems).

The current inventors have recognized that hi-res range-Doppler LIDAR can be utilized to improve the control of a vehicle. For example, when a component of prior INS solution fails, data feeds from the hi-res range-Doppler LIDAR may be called upon to help localize the vehicle. An example would be searching for objects with known relative positions (e.g., lane markings) or known geospatial positions (e.g., a building or roadside sign or orbiting markers) in an attempt to improve solutions for a vehicle's position and velocity.

However, the dependence of multiple subsystems (e.g., GPS, INS, hi-res range Doppler LIDAR, etc.) may become complicated when sub-components of any of the system behaves unreliably. The conventional INS solution, for example, is notoriously unreliable. For this reason, there is also a long-felt need in providing a reliable solution where multiple subsystems may coexist on the same LIDAR system.

Accordingly, the present disclosure is directed to systems and methods for resolving detection ambiguity in a manner that improves the capability of a LIDAR system to compensate for Doppler Effects in optical range measurements for operating a vehicle. The systems and methods also improve the reliability of the LIDAR system by configuring multiple subsystems to reliably coexist (e.g., via communication and/or interaction) with the LIDAR system.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. Optical Doppler and Range Detection Overview

Using an optical phase-encoded signal for measurement of range, the transmitted signal is in phase with a carrier (phase=0) for part of the transmitted signal and then changes by one or more phases changes represented by the symbol $\Delta\varphi$ (so phase=$\Delta\varphi$) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\varphi^* \{0, 1, 2 \text{ and } 3\}$, which, for $\Delta\varphi=\pi/2$ (90 degrees), equals $\{0, \pi/2, \pi \text{ and } 3\pi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (thus, it is a non-coherent scheme).

For optical ranging applications, the carrier frequency is an optical frequency $fc$ and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

The observed frequency $f'$ of the return differs from the correct frequency $f=fc+f_0$ of the return by the Doppler effect given by Equation 1.

$$f' = \frac{(c + v_o)}{(c + v_s)} f \qquad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, $\Delta f = f' - f$, is the Doppler shift, $\Delta f_D$, which causes problems for the range measurement, and is given by Equation 2.

$$\Delta f_D = \left[\frac{(c + v_o)}{(c + v_s)} - 1\right] f \quad (2)$$

Note that the magnitude of the error increases with the frequency $f$ of the signal. Note also that for a stationary LIDAR system ($v_o = 0$), for an object moving at 10 meters a second ($v_s = 10$), and visible light of frequency about 500 THz, then the size of the error is on the order of 16 megahertz (MHz, 1 MHz=$10^6$ hertz, Hz, 1 Hz=1 cycle per second). In various implementations described below, the Doppler shift error is detected and used to process the data for the calculation of range and relative speed.

In phase coded ranging, the arrival of the phase coded reflection is detected in the return by cross correlating the transmitted signal or other reference signal with the returned signal, implemented practically by cross correlating the code for a RF signal with an electrical signal from an optical detector using heterodyne detection and thus down-mixing back to the RF band. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross-correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R = c * \Delta t / 2 \quad (3)$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined; and, range R is not as readily produced.

According to various implementations of the inventor's previous work, the Doppler shift is determined in the electrical processing of the returned signal; and the Doppler shift is used to correct the cross-correlation calculation. Thus, a peak is more readily found and range can be more readily determined.

In some Doppler compensation implementations, rather than finding $\Delta f_D$ by taking the spectrum of both transmitted and returned signals and searching for peaks in each, then subtracting the frequencies of corresponding peaks. It is more efficient to take the cross spectrum of the in-phase and quadrature component of the down-mixed returned signal in the RF band.

As described in more detail in inventor's previous work the Doppler shift(s) detected in the cross spectrum are used to correct the cross correlation so that the peak is apparent in the Doppler compensated Doppler shifted return at lag $\Delta t$, and range R can be determined. In some implementations, simultaneous in-phase and quadrature (I/Q) processing is performed as described in more detail in international patent application publication entitled "Method and system for Doppler detection and Doppler correction of optical phase-encoded range detection" by S. Crouch et al., WO2018/144853. In other implementations, serial I/Q processing is used to determine the sign of the Doppler return as described in more detail in patent application publication entitled "Method and System for Time Separated Quadrature Detection of Doppler Effects in Optical Range Measurements" by S. Crouch et al., WO20019/014177. In other implementations, other means are used to determine the Doppler correction; and, in various implementations, any method or apparatus or system known in the art to perform Doppler correction is used.

In optical chirp measurement of range, power is on for a limited pulse duration, $\tau$ starting at time 0. The frequency of the pulse increases from $f_1$ to $f_2$ over the duration $\tau$ of the pulse, and thus has a bandwidth $B = f_2 - f_1$. The frequency rate of change is $(f_2 - f_1)/\tau$.

When the returned signal is received from an external object after covering a distance of 2R, where R is the range to the target, the returned signal start at the delayed time $\Delta t$ is given by 2R/c, where c is the speed of light in the medium (approximately $3 \times 10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R = (f_2 - f_1)/\tau * 2R/c = 2BR/c\tau \quad (4a)$$

The value of $f_R$ is measured by the frequency difference between the transmitted signal and returned signal in a time domain mixing operation referred to as de-chirping. So the range R is given by Equation 4b.

$$R = f_R c\tau / 2B \quad (4b)$$

Of course, if the returned signal arrives after the pulse is completely transmitted, that is, if 2R/c is greater than z, then Equations 4a and 4b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received. This will have a different measured value of $f_R$ that gives a different range using Equation 4b. In some circumstances, multiple additional returned signals are received.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other implementations, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990. The disadvantage is that the digitizer bandwidth requirement is generally higher. The positive aspects of coherent detection are otherwise retained.

In some implementations, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

As described in U.S. patent application publication by Crouch et al., entitled "Method and System for Doppler Detection and Doppler Correction of Optical Chirped Range Detection," WO2018/160240, when selecting the transmit (TX) and local oscillator (LO) chirp waveforms, it is advantageous to ensure that the frequency shifted bands of the system take maximum advantage of available digitizer bandwidth. In general, this is accomplished by shifting either the up chirp or the down chirp to have a range frequency beat close to zero.

In the case of a chirped waveform, the time separated I/Q processing (aka time domain multiplexing) can be used to overcome hardware requirements of other approaches as described above. In that case, an AOM is used to break the range-Doppler ambiguity for real valued signals. In some implementations, a scoring system is used to pair the up and down chirp returns as described in more detail in the above cited patent application publication WO2018/160240. In other implementations, I/Q processing is used to determine the sign of the Doppler chirp as described in more detail in patent application publication entitled "Method and System for Time Separated Quadrature Detection of Doppler Effects in Optical Range Measurements" by S. Crouch et al., WO20019/014177.

2. Optical Detection Hardware Overview

In order to depict how to use hi-res range-Doppler detection systems, some generic hardware approaches are described. FIG. 1 is a block diagram that illustrates example components of a high resolution Doppler LIDAR system 100, according to an implementation. Optical signals are indicated by arrows. Electronic wired or wireless connections are indicated by segmented lines without arrowheads. A laser source 112 emits a carrier wave or beam 101 that is phase or frequency modulated in modulator 182a, before or after splitter 116, to produce a phase coded or chirped optical signal 103 that has a duration D. A splitter 116 splits the modulated (or, as shown, the unmodulated) optical signal for use in a reference path 120. A target beam 105, also called transmitted signal herein, with most of the energy of the beam 101 is produced. A modulated or unmodulated reference beam 107a, with a much smaller amount of energy that is nonetheless enough to produce good mixing with the returned beam 191 scattered from an object (not shown), is also produced. In the illustrated implementation, the reference beam 107a is separately modulated in modulator 182b. The reference beam 107a passes through reference path 120 and is directed to one or more detectors as reference beam 107b. In some implementations, the reference path 120 introduces a known delay sufficient for reference beam 107b to arrive at the detector array 130 with the scattered light from an object outside the LIDAR within a spread of ranges of interest. In some implementations, the reference beam 107b is called the local oscillator (LO) signal referring to older approaches that produced the reference beam 107b locally from a separate oscillator. In various implementations, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 1, with or without a path length adjustment to compensate for the phase or frequency difference observed or expected for a particular range; or, 3) using a frequency shifting device (acousto-optic modulator) or time delay of a local oscillator waveform modulation (e.g., in modulator 182b) to produce a separate modulation to compensate for path length mismatch; or some combination. In some implementations, the object is close enough and the transmitted duration long enough that the returns sufficiently overlap the reference signal without a delay.

The transmitted signal is then transmitted to illuminate an area of interest, often through some scanning optics 118. The detector array is a single paired or unpaired detector or a 1 dimensional (1D) or 2 dimensional (2D) array of paired or unpaired detectors arranged in a plane roughly perpendicular to returned beams 191 from the object. The reference beam 107b and returned beam 191 are combined in zero or more optical mixers 184 to produce an optical signal of characteristics to be properly detected. The frequency, phase or amplitude of the interference pattern, or some combination, is recorded by acquisition system 140 for each detector at multiple times during the signal duration D.

The number of temporal samples processed per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 150, such as a computer system described below with reference to FIG. 30, or a chip set described below with reference to FIG. 31. A signed Doppler compensation module 170 determines the sign and size of the Doppler shift and the corrected range based thereon along with any other corrections described herein. In some implementations, the processing system 150 also provides scanning signals to drive the scanning optics 118, and includes a modulation signal module to send one or more electrical signals that drive the modulators 182a, 182b. In the illustrated implementation, the processing system also includes a vehicle odometry module 172 to provide information on the vehicle position and movement relative to a shared geospatial coordinate system or relative to one or more detected objects or some combination. In some implementations the vehicle odometry module 172 also controls the vehicle (not shown) in response to such information.

Any known apparatus or system may be used to implement the laser source 112, modulators 182a, 182b, beam splitter 116, reference path 120, optical mixers 184, detector array 130, scanning optics 118, or acquisition system 140. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

2.1 Scan Pattern(s) for Hi-Red Doppler LIDAR System

FIG. 2A is a block diagram that illustrates a saw tooth scan pattern for a hi-res Doppler LIDAR system, used in some implementations. The scan sweeps through a range of azimuth angles (horizontally) and inclination angles (vertically above and below a level direction at zero inclination). In other implementations, other scan patters are used. Any scan pattern known in the art may be used in various implementations. For example, in some implementations, adaptive scanning is performed using methods described in international patent application publications by Crouch entitled "Method and system for adaptive scanning with optical ranging systems," WO2018/125438, or entitled "Method and system for automatic real-time adaptive scanning with optical ranging systems," WO2018/102188. In some implementations, unidirectional scanning is used, with each successive scan in the same direction but at a different inclination. In some implementations, multiple laser sources are used, e.g., multiple stacked lasers to provide scans at different inclination angles or vertical spacings or some combination.

Figure 2B:
FIG. 2B is an image that illustrates an example speed point cloud produced by a hi-res Doppler LIDAR system, according to an implementation.

FIG. 2B is an image that illustrates an example speed point cloud produced by a scanning hi-res Doppler LIDAR system, according to an implementation. Although called a point cloud each element of the cloud represents the return from a spot. The spot size is a function of the beam width and the range. In some implementations, the beam is a pencil beam that has circularly symmetric Gaussian collimated beam and cross section diameter (beam width) emitted from the LIDAR system, typically between about 1 millimeters (mm, 1 mm=$10^{-3}$ meters) and 100 mm. Each pixel of the 2D image indicates a different spot illuminated by a particular azimuth angle and inclination angle. In some implementations, each spot may be associated with a third dimension (3D), such as a range or a speed relative to the LIDAR. In some implementations, each spot may be associated with a third and a fourth dimension (4D), such as a range and a speed relative to the LIDAR. In some implementations, a reflectivity measure is also indicated by the intensity or amplitude of the returned signal, thereby introducing a fifth dimension (5D). Thus, each point of the point cloud may represent at least a 2D vector, a 3D vector, a 4D vector, or a 5D vector.

Using the above techniques, a scanning hi-res range-Doppler LIDAR may produce a high-resolution 3D point cloud image with point by point signed relative speed of the scene in view of the LIDAR system. With current hi-res Doppler LIDARs, described above, a Doppler relative speed is determined with high granularity (<0.25 m/s) across a very large speed spread (>+/−100 m/s). The use of coherent measurement techniques translates an inherent sensitivity to Doppler into a simultaneous range-Doppler measurement for the LIDAR scanner. Additionally, the coherent measurement techniques allow a very high dynamic range measurement relative to more traditional LIDAR solutions. The combination of these data fields allows for powerful vehicle location in the presence of INS dropouts.

3. Vehicle Control Using High Resolution Doppler LIDAR

A vehicle, in some implementations, may be controlled at least in part based on data received from a hi-res Doppler LIDAR system mounted on the vehicle.

FIG. 3A is a block diagram that illustrates an example system that includes at least one hi-res Doppler LIDAR system 320 mounted on a vehicle 310, according to an implementation. The vehicle has a center of mass indicted by a star 311 and travels in a forward direction given by arrow 313. In some implementations, the vehicle 310 includes a component, such as a steering or braking system (not shown), operated in response to a signal from a processor. In some implementations the vehicle has an on-board processor 314, such as chip set depicted in FIG. 31. In some implementations, the on-board processor 314 is in wired or wireless communication with a remote processor, as depicted in FIG. 30. The hi-res Doppler LIDAR uses a scanning beam 322 that sweeps from one side to another side, represented by future beam 323, through an azimuthal field of view 324, as well as through vertical angles (not shown) illuminating spots in the surroundings of vehicle 310. In some implementations, the field of view is 360 degrees of azimuth. In some implementations the inclination angle field of view is from about +10 degrees to about −10 degrees or a subset thereof.

In some implementations, the vehicle includes ancillary sensors (not shown), such as a GPS sensor, odometer, tachometer, temperature sensor, vacuum sensor, electrical voltage or current sensors, among others well known in the art. In some implementations, a gyroscope 330 is included to provide rotation information.

Also depicted in FIG. 3A is a global coordinate system represented by an arrow pointing north and an arrow pointing east from a known geographic location represented by a point at the base of both arrows. Data in a mapping system, as a geographical information system (GIS) database is positioned relative to the global positioning system. In controlling a vehicle, it is advantageous to know the location and heading of the vehicle in the global coordinate system as well as the relative location and motion of the vehicle compared to other moving and non-moving objects in the vicinity of the vehicle.

Figure 3B:
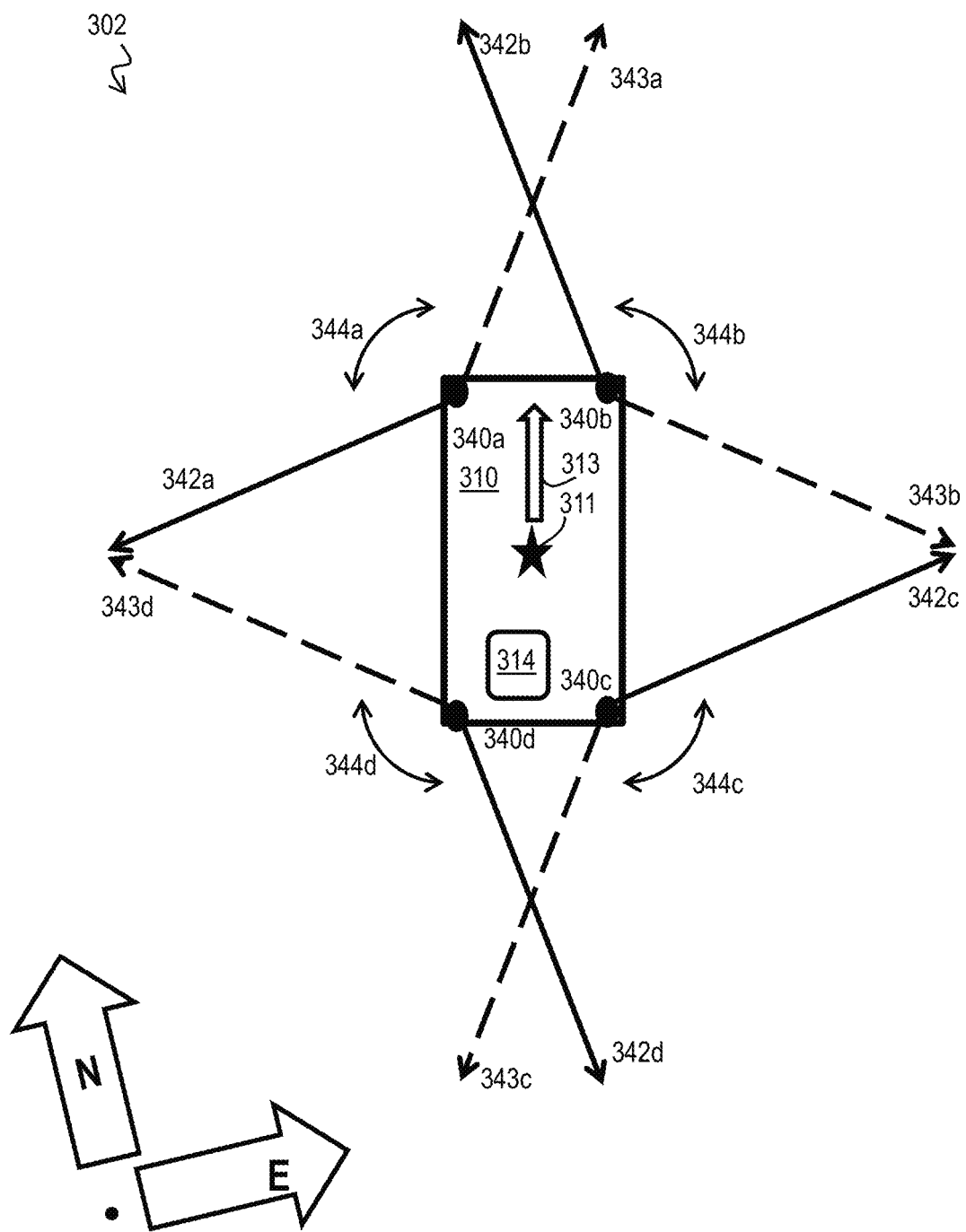
FIG. 3B is a block diagram that illustrates an example system that includes multiple hi-res Doppler LIDAR system mounted on a vehicle, according to an implementation.

FIG. 3B is a block diagram that illustrates an example system that includes multiple hi-res Doppler LIDAR systems mounted on a vehicle 310, according to an implementation. Items 310, 311, 313 and 314, and the global coordinate system, are as depicted in FIG. 3A. Here the multiple hi-res Doppler LIDAR systems, 340a, 340b, 340c, 340c (collectively referenced hereinafter as LIDAR systems 340) are positioned on the vehicle 310 to provide complete angular coverage, with overlap at some angles, at least for ranges beyond a certain distance. FIG. 3B also depicts the fields of view 344a, 344b, 344c, 344d, respectively (hereinafter collectively referenced as fields of view 344) between instantaneous leftmost beams 342a, 342b, 342c, 342d, respectively (hereinafter collectively referenced as leftmost beams 342) and rightmost beams 343a, 343b, 343c, 343d, respectively (hereinafter collectively referenced as rightmost beams 343). In other implementations, more or fewer hi-res Doppler LIDAR systems 340 are used with smaller or larger fields of view 344 and synchronous or asynchronous (e.g., oppositely) sweeping scans.

Figure 3C:
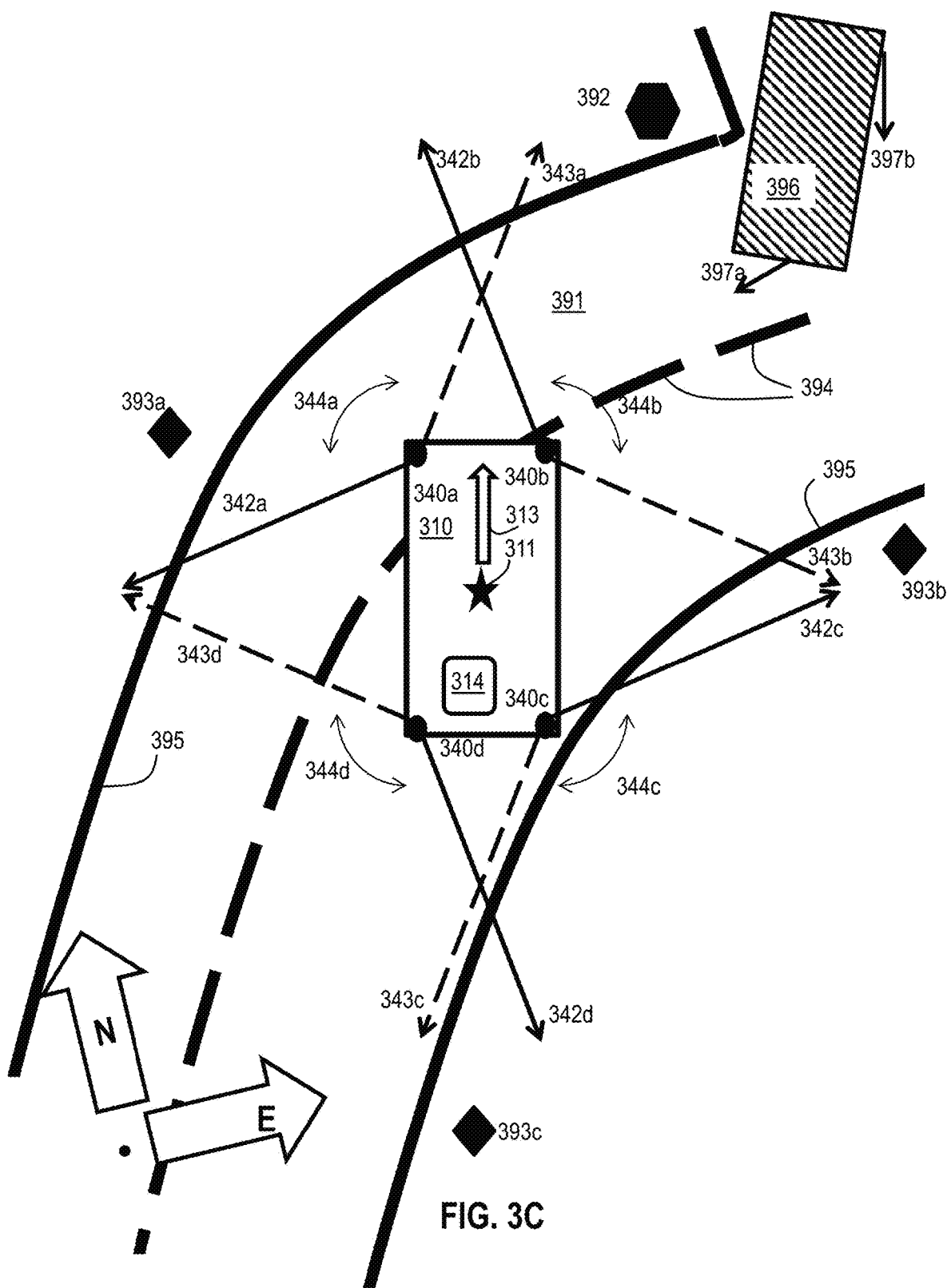
FIG. 3C is a block diagram that illustrates an example system that includes multiple hi-res Doppler LIDAR system mounted on a vehicle in relation to objects detected in the point cloud, according to an implementation.

FIG. 3C is a block diagram that illustrates an example system that includes multiple hi-res Doppler LIDAR systems 340 mounted on a vehicle 310 in relation to objects detected in the point cloud, according to an implementation. Items 310, 311, 313, 314, 340, 342, 343 and 344, as well as the global coordinate system, are as depicted in FIG. 3B. Items detectable in a 3D point cloud from the systems 340 includes road surface 391, curbs 395, stop sign 392, light posts 393a, 393b, 393c (collectively referenced hereinafter as light posts 393), lane markings 394 and moving separate vehicle 396. The separate moving vehicle 396 is turning and so has a different velocity vector 397a at a front of the vehicle from a velocity vector 397b at the rear of the vehicle. Some of these items, such as stop sign 392 and light posts 393, might have global coordinates in a GIS database.

FIG. 3D is a flow chart that illustrates an example method for vehicle odometry using coherent range Doppler optical sensors, according to an implementation. Although steps are depicted in FIG. 3D as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementation, some or all operations of method 300D may be performed by the high resolution Doppler LIDAR system 100 in FIG. 1.

The method 300D includes the operation 302D of operating a Doppler light detection and ranging (LIDAR) system to collect raw point cloud data that indicates for a point a plurality of dimensions, wherein a dimension of the plurality of dimensions includes an inclination angle, an azimuthal angle, a range, or a relative speed between the point and the LIDAR system. The method 300D includes the operation 304D of determining a corrected velocity vector for the Doppler LIDAR system based on the raw point cloud data. The method 300D includes the operation 306D of producing revised point cloud data that is corrected for the velocity of the Doppler LIDAR system.

Figure 4:
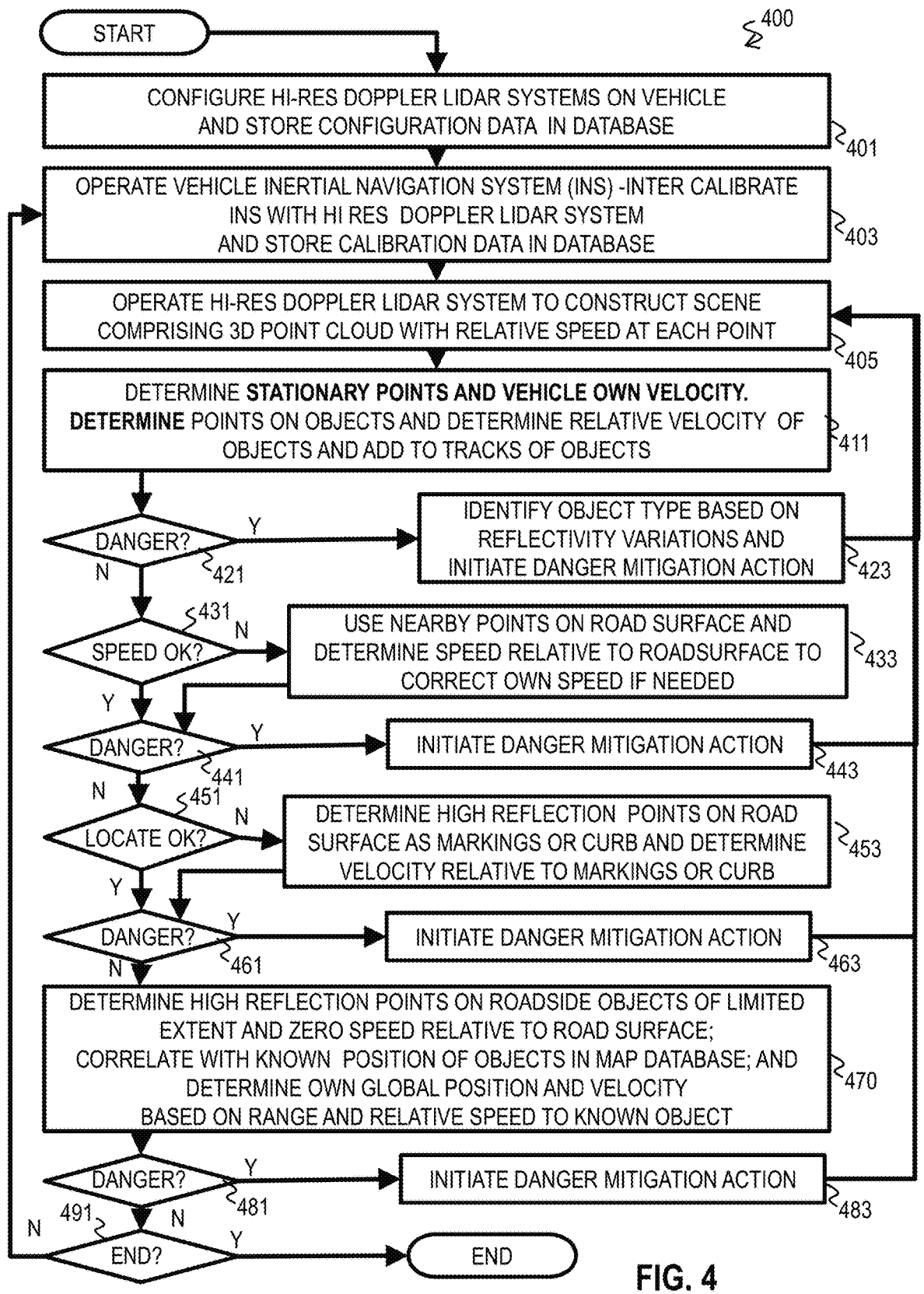
FIG. 4 is a flow chart that illustrates an example method for using data from a hi-res Doppler LIDAR system in an automatic vehicle setting, according to an implementation.

FIG. 4 is a flow chart that illustrates an example method 400 for using data from a high-resolution Doppler LIDAR system in an automatic or assisted vehicle setting, according to an implementation. Although steps are depicted in FIG. 4, and in subsequent flowcharts as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways.

In step 401, a high-resolution Doppler LIDAR system 340 is configured on a vehicle 310 (also called an own vehicle below to distinguish from separate vehicles 396 in the vicinity). In some implementations, the configuration includes installing the LIDAR system 340 on the vehicle 310. Configuration data is stored in one or more own vehicle databases, either locally on vehicle 310 or remotely or some combination. Configuration data includes at least the position of the system 340 relative to a center of mass 311 of the vehicle and a field of view 344 of the system relative to the forward direction 313 of the vehicle. In some implementations, step 40 includes storing other constants or parameter values of methods used in one or more of the following steps, such as a value for a solution tolerance for the own vehicle's velocity.

In step 403, sensor systems on own vehicle are operated. For example, an inertial navigation system (INS) is operated to obtain speed information from the odometer, position information from a Global Positioning System (GPS) receiver, direction information from a gyroscope, and 3D point cloud data from the hi-res Doppler LIDAR system to calibrate the position and direction of the field of view of the LIDAR relative to the center of mass and direction of the vehicle. The calibration data is stored in the one or more databases. In some implementations, only LIDAR systems are included and step 403 is omitted and control flow depicted to step 403 goes directly to step 405.

In step 405, even beyond any calibration measurements, the hi-res Doppler LIDAR is operated to construct a scene comprising a 3D point cloud with relative speed at each point as a result of one complete scan at each of one or more such LIDAR systems 340. In step 411, the scene data is analyzed to determine stationary objects (e.g., roadbed 391 or traffic sign 392 or lamp posts 393 or curb 395 or markings 394 or some combination), own speed relative to stationary objects (also called ego-motion herein), and speed and direction of one or more moving objects (e.g., 396), if any. Various implementations of methods for determining each or all of these results are described in more detail below with reference to the remaining flow diagrams.

It is advantageous if the determination of ego-motion is fast enough to detect motion changes (accelerations) before large distances (on the order of the size of the vehicle) are covered. The maximum component-wise change of the vehicle velocity vector ($\alpha_{max}$) is advantageously small compared to the product of the scan period ($T_{scan}$) and the Doppler resolution (m) of the LIDAR, as given by Equation 5.

$$\alpha_{max} < T_{scan} r_D \qquad (5)$$

For example, a LIDAR sensor with $r_D$=0.25 m/s and a 10 Hz scan rate ($T_{scan}$=0.1 sec) may fail to properly segment moving actors if the vehicle's acceleration exceeds 2.5 m/s². As this is not a particularly high value, current implementations solve for velocity on each "Framelet" (left-to-right scan of a vertical array of one or more concurrent Doppler LIDAR beams), rather than a full vertical frame (which consists of one or more framelets conducted sequentially in time at differing inclination angle offsets). This allows typical operation of the velocity solution to have an effective 80 Hz scan rate, giving a maximum acceleration of 20 m/s²—more than two times the acceleration of gravity, sufficient for many vehicle scenarios, including most automobile operations. Similar limits exist for velocity estimation of other objects, because, to first order, the variation in velocity across the extent of the other object advantageously exceeds the characteristic Doppler noise value for a determination of the motion of the other object.

In general, it is useful to have each spot of the point cloud measured in less than a millisecond so that point clouds of hundreds of spots can be accumulated in less than a tenth of a second. Faster measurements, on the order of tens of microseconds, allow point clouds a hundred times larger. For example, the hi-res Doppler phase-encoded LIDAR described above can achieve a 500 Megabits per second (Mbps) to 1 Gigabits per Second (Gbps) baud rate. As a result, the time duration of these codes for one measurement is then between about 500 nanoseconds (ns, $1\ ns=10^{-9}$ seconds) and 8 microseconds. It is noted that the range window can be made to extend to several kilometers under these conditions and that the Doppler resolution can also be quite high (depending on the duration of the transmitted signal).

In step 421, it is determined if the moving objects represent a danger to the own vehicle, e.g., where own vehicle velocity or moving object velocity or some combination indicates a collision or near collision. If so, then, in step 423, danger mitigation action is caused to be initiated, e.g., by sending an alarm to an operator or sending a command signal that causes one or more systems on the own vehicle, such as brakes or steering or airbags, to operate. In some implementations, the danger mitigation action includes determining what object is predicted to be involved in the collision or near collision. For example, collision avoidance is allowed to be severe enough to skid or roll the own vehicle if the other object is a human or large moving object like a train or truck, but a slowed collision is allowed if the other object is a stop sign or curb. In some of these implementations, the object is identified based on reflectivity variations or shape or some combination using any methods known in the art. For example, in some implementations, object identification is performed using methods described in PCT patent application by Crouch entitled "method and system for classification of an object in a point cloud data set," WO2018/102190. In some implementations, the object is identified based on global position of own vehicle and a GIS indicating a global position for the other stationary or moving object. Control then passes back to step 405, to collect the next scene using the hi-res Doppler LIDAR system 340. The loop of steps 405 to 411 to 421 to 423 is repeated until there is no danger determined in step 421. Obviously, the faster a scan can be measured, the faster the loop can be completed.

In step 431, it is determined if the speed of the own vehicle is reliable (indicated by "OK" in FIG. 4). For example, the calibration data indicates the odometer is working properly and signals are being received from the odometer, or the gyroscope indicates the own vehicle is not spinning. In some implementations, speed determined from the 3D point cloud with relative speed, as described in more detail below, is used to determine speed in the global coordinate system and the speed is not OK if the odometer disagrees with the speed determined from the point cloud or if the odometer is missing or provides no signal. If not, then in step 433 speed is determined based on the 3D point cloud with relative speed data, as described in more detail below. In some implementations, such speed relative to the road surface or other ground surface is determined automatically in step 411. In some implementations, that previously used speed relative to the ground surface is used in step 433. In some implementations, 3D point cloud data are selected for such speed determination and the speed determination is made instead, or again, during step 433. Control then passes to step 441. In various implementations, as explained in more detail below, the determination of own vehicle turning is accomplished during step 411 or step 433.

In step 441, it is determined if the speed and direction of the own vehicle indicate danger, such as danger of leaving the roadway or of exceeding a safe range of speeds for the vehicle or road conditions, if, for example, values for such parameters are in the one or more own vehicle databases. If so, control passes to step 443 to initiate a danger mitigation action. For example, in various implementations, initiation of danger mitigation action includes sending an alarm to an operator or sending a command signal that causes one or more systems on the own vehicle, such as brakes or steering, to operate to slow the vehicle to a safe speed and direction, or airbags to deploy. Control then passes back to step 405 to collect the hi-res Doppler LIDAR data to construct the next scene In step 451, it is determined if the relative location of the own vehicle is reliable (indicated by "OK" in FIG. 4). For example, distance to high reflectivity spots, such as a curb or lane markings, are consistent with being on a road going in the correct direction. If not, then in step 453 relative location is determined based on the 3D point cloud with relative speed data based on measured distances to high reflectivity spots, such as road markings and curbs. In some implementations, such relative location of own vehicle is determined automatically in step 411. In some implementations, that previously used relative location of own vehicle is used in step 453. In some implementations, 3D point cloud data of stationary highly reflective objects are selected to determine relative location of own vehicle during step 453. Control then passes to step 461.

In step 461, it is determined if the relative location of the own vehicle indicates danger, such as danger of leaving the roadway. If so, control passes to step 463 to initiate a danger mitigation action. For example, in various implementations, initiation of danger mitigation action includes sending an alarm to an operator or sending a command signal that causes one or more systems on the own vehicle, such as brakes or steering, to operate to direct the own vehicle to remain on the roadway, or airbags to deploy. Control then passes back to step 405 to collect the hi-res Doppler LIDAR data to construct the next scene.

If there is no danger detected in steps 421, 441 or 461, then control passes to step 470. In step 470, global location is determined based on the 3D point cloud with relative speed data. In some implementations, such global location of own vehicle is determined automatically in step 411. In some implementations, that previously used global location of own vehicle is used again in step 470. In some implementations, 3D point cloud data of stationary objects, such as road signs and lamp posts, or moving objects with precisely known global coordinates and trajectories, such as orbiting objects, are selected and cross referenced with the GIS to determine global location of own vehicle during step 470. In some implementations, step 470 is omitted. Control then passes to step 481.

In step 481, it is determined if the global location of the own vehicle indicates danger, such as danger of being on the wrong roadway to progress to a particular destination. If so, control passes to step 483 to initiate a danger mitigation action. For example, in various implementations, initiation of danger mitigation action includes sending an alarm to an operator or sending a command signal that causes one or more systems on the own vehicle, such as brakes or steering, to operate to direct the own vehicle to the correct global location, or airbags to deploy. Control then passes back to step 405 to collect the hi-res Doppler LIDAR data to construct the next scene.

If danger is not detected in any steps 421, 441, 461 or 481, then control passes to step 491 to determine if end conditions are satisfied. Any end conditions can be used in various implementations. For example, in some implementations, end conditions are satisfied if it is detected that the vehicle has been powered off, or arrived at a particular destination, or a command is received from an operator to turn off the system. If end conditions are not satisfied, then control passes back to step 403 and following, described above. Otherwise, the process ends.

4. Six-Axis Doppler LIDAR Odometry

Various implementations provide methods for using Doppler LIDAR sensor data to compute a vehicle's 3D (Cartesian) translational velocity and to correct for errors in the point cloud data resulting from this motion, combined with the scanning operation of the Doppler LIDAR sensor(s). A Doppler LIDAR, with a single beam origin (combined transmitter/receiver or closely spaced transmitter/receiver pair) cannot differentiate between purely translational vehicle motion and radial/angular motion, so not all implementations can account for point cloud errors caused by a vehicle rapidly changing its heading. Other implementations, however provide approaches for correcting point cloud errors caused by a vehicle rapidly changing its heading as well as point cloud projection errors stemming from significant acceleration of the vehicle during the scan period.

FIG. 5 is a flow chart that illustrates an example method 500 for using data from one or more Doppler LIDAR sensors in an automatic vehicle setting to compute and to correct a translational velocity vector of the vehicle and to output a corrected point cloud based on the translation velocity vector, according to an implementation.

Still referring to FIG. 5, at step 501, the method 500 may be started. Starting the method 500 may include initializing one or more Doppler LIDAR sensors, a computer system 3000 as illustrated in FIG. 30, a chip set 3100 as illustrated in FIG. 31, or any other devices or components described according to various implementations.

Still referring to FIG. 5, at step 502, Doppler LIDAR data is collected from one or more sensors. According to various implementations, the sensors may be positioned on or in a vehicle. For example, the one or more sensors may be positioned on or in a vehicle as components of an autonomous driving system. The one or more sensors may be positioned in a variety of configurations and may collect Doppler LIDAR data in a variety of ways. Each sensor may scan or sweep along an azimuth angle to collect a series of Doppler LIDAR readings. The direction of the scan or sweep may be unidirectional or bidirectional. Details of unidirectional and bidirectional scanning of one or more sensors is illustrated in FIGS. 8, 9, 10, 11, 12, 13, 14, 15, and 16. Method 500 is useful for all configurations that include one or more sensors. Method 500 may be particularly useful with respect to single sensor configurations and for configurations wherein the sensors are stacked orthogonally to a direction of unidirectional scanning.

Still referring to FIG. 5, at step 503, the method 500 may include generating a raw point cloud based on the Doppler LIDAR data collected from the one or more sensors. The point cloud may be generated as described according to any of the various implementations described herein. Each point within the point cloud may be represented by azimuth angle (for example, a left-right angle relative to the sensor), inclination angle (for example, an up-down angle relative to the sensor), range (for example, a distance from the sensor), and a speed component in a direction of a beam emitted from the sensor (for example, a velocity vector).

Still referring to FIG. 5, at step 504, the method 500 may include computing a velocity vector, including a translation velocity of the vehicle or the one or more sensors. Such a velocity vector may be referred to as an ego-motion velocity vector. The ego-motion velocity vector may include velocity values for translation along an x-axis, translation along a y-axis, translation along a z-axis, rotation about the x-axis, rotation about the y-axis, and rotation about the z-axis. The translation velocity of the vehicle refers to the velocity values for translation along an x-axis, translation along a y-axis, and translation along a z-axis. The rotational velocity values are sometimes referred to, by those skilled in the art, as "roll", "pitch", and "yaw."

Still referring to FIG. 5, at step 505, the method 500 may include determining whether the one or more sensors is unidirectional. As used herein, the term "unidirectional" has its ordinary meaning, for example, moving or operating in a single direction. With respect to a Doppler LIDAR sensor, this means that the sensor's beam sweeps or scans in a single direction, for example from left-to-right only or from right-to-left only. In contrast, a sensor may also be multidirectional or counter-scanning. As used herein, the term "multidirectional" has its ordinary meaning, moving or operating in multiple directions. Counter-scanning is synonymous in this context for a multidirectional sensor. With respect to a Doppler LIDAR sensor, a counter-scanning sensor's beam sweeps or scans in two or more different directions, for example from left-to-right and from right-to-left. Determining whether a single sensor is unidirectional is straightforward. A set of multiple unidirectional scanners can be determined not to be "unidirectional" when considered as a set at step 505, if at least one of the unidirectional scanners scans or operates in a different direction than the other scanners. For example, a set of two left-right scanners and one right-left scanner would be considered to be multidirectional, or not unidirectional, even though each individual scanner is a unidirectional scanner. Of course, any set of scanners that includes a multidirectional scanner would be considered to be multidirectional or not unidirectional at step 505.

Still referring to FIG. 5, if it is determined at step 505 not unidirectional, then, in step 506, the method 500 may include correcting for errors by averaging translational velocity calculated for each direction. As discussed in greater detail hereinafter, for a single sensor with one or more vertically stacked beams scanning in azimuth (horizontally), acceleration of the vehicle during the scan period is ambiguous with transverse vehicle velocity, as the velocity of the vehicle changes over the period of the scan. In the case of a vehicle accelerating while a single sensor scans from left to right, the Doppler LIDAR readings returning to the right of the vehicle's velocity vector will have higher values compared to those on the left. Without correction, this will result in an ego-motion velocity vector erroneously deflected to the right of the true orientation. This can result in erroneous rotation rate solutions, due to apparent, but inconsistent, transverse velocity across different sensor/beam origins. If the sensors are counter-scanning, then for a single beam or beams stacked orthogonally to the direction of bidirectional "counter" scanning, the sign of the erroneous transverse velocity will reverse when the direction of scan does. Various implementations, therefore, correct for errors, by averaging the 3D velocity solution across evenly balanced opposing-direction scans to cancel out the erroneous transverse velocity.

Still referring to FIG. 5, if it is determined at step 505 unidirectional, then, in step 507, the method 500 may include correcting for errors by detecting a discontinuity in velocity measurements at a limit of a sensor's field of vision. For a single beam or beams stacked orthogonally to the direction of unidirectional scanning, true transverse velocity may be detected, according to various implementations, as a discontinuity in velocity measurement when the beam wraps around to the far side of the field of view (FOV) of the Doppler LIDAR sensor (as described in more detail below with reference to FIG. 27), as purely forward velocity would have symmetric velocity measurements (as described in more detail below with reference to FIG. 26).

Still referring to FIG. 5, at step 508, the method 500 may include determining a corrected translational velocity of the vehicle. The corrected translation velocity may be based on the error corrections made in step 506 or step 507.

Still referring to FIG. 5, at step 509, the method 500 may include using the corrected translational velocity to distinguish between stationary and nonstationary objects in point cloud. At step 510, the method 500 may include removing nonstationary points from the point cloud. At step 511, the method 500 may include extracting features from the point cloud. At step 512, the method 500 may include using the corrected translational velocity as initial guess for motion to correlate with any previously extracted features. At step 513, the method 500 may include correlating the extracted features with any previously extracted features. At step 514, the method 500 may include updating a map of stationary features in a 3D environment and placing the vehicle within the environment. The method 500 may be repeated one or more times by proceeding to step 502. At step 515, the method 500 may include outputting a corrected point cloud. The corrected point cloud may be outputted upon completion of all loops through the method 500 or upon each completion of step 514.

FIG. 6 is a flow chart that illustrates an example method 600 for using data from a plurality of Doppler LIDAR sensors in an automatic vehicle setting to compute and to correct a rotational velocity vector of the vehicle and to output a corrected point cloud based on the rotational velocity vector, according to an implementation.

Still referring to FIG. 6, at step 601, the method 600 may be started. Starting the method 600 may include initializing one or more Doppler LIDAR sensors, a computer system 3000 as illustrated in FIG. 30, a chip set 3100 as illustrated in FIG. 31, or any other devices or components described according to various implementations.

Still referring to FIG. 6, at step 602, the method 600 may include collecting Doppler LIDAR data from a plurality of sensors having different moment arms relative to a center of rotation of a vehicle. According to various implementations, the plurality of sensors may be positioned on or in a vehicle. For example, the plurality of sensors may be positioned on or in a vehicle as components of an autonomous driving system. The plurality of sensors may be positioned in a variety of configurations and may collect Doppler LIDAR data in a variety of ways. Each sensor may scan or sweep along an azimuth angle to collect a series of Doppler LIDAR readings. The direction of the scan or sweep may be unidirectional or bidirectional. Details of unidirectional and bidirectional scanning of one or more sensors is illustrated in FIGS. 8, 9, 10, 11, 12, 13, 14, 15, and 16. Method 600 may be particularly useful with respect to a plurality of sensors having different moment arms relative to a center of rotation of a vehicle as discussed in more detail with reference to FIGS. 15 and 16.

Still referring to FIG. 6, at step 603, the method 600 may include generating a raw point cloud based on the Doppler LIDAR data collected from the plurality of sensors. The point cloud may be generated as described according to any of the various implementations described herein. Each point within the point cloud may be represented by azimuth angle (for example, a left-right angle relative to the sensor), inclination angle (for example, an up-down angle relative to the sensor), range (for example, a distance from the sensor), and a speed component in a direction of a beam emitted from the sensor (for example, a velocity vector).

Still referring to FIG. 6, at step 604, the method 600 may include computing a velocity vector, including at least a radial motion of the vehicle for each beam. The radial motion may include a rotation rate and direction of the vehicle. The velocity vector may be referred to as an ego-motion velocity vector. The ego-motion velocity vector may include velocity values for translation along an x-axis, translation along a y-axis, translation along a z-axis, rotation about the x-axis, rotation about the y-axis, and rotation about the z-axis. The translation velocity of the vehicle refers to the velocity values for translation along an x-axis, translation along a y-axis, and translation along a z-axis. The rotational velocity values are sometimes referred to, by those skilled in the art, as "roll", "pitch", and "yaw." The radial motion of the vehicle that is computed may include the rotational velocity values including the roll, the pitch, and the yaw of the vehicle. For an automobile, at least two of these rotational velocity values should be at or near zero during normal operation; for this reason, the radial motion of the vehicle primarily refers to the rotation of the vehicle about a center of rotation. Radial motion may, for example, reflect the vehicle's rotation while turning.

Still referring to FIG. 6, at step 605, the method 600 may include determining whether the plurality of sensors is unidirectional. As discussed in greater detail with respect to step 505 in FIG. 5, a set of multiple unidirectional scanners can be determined not to be "unidirectional," if at least one of the unidirectional scanners scans or operates in a different direction than the other scanners and any set of scanners that includes a multidirectional scanner would be considered to be multidirectional or not unidirectional at step 605.

Still referring to FIG. 6, if it is determined at step 605 not unidirectional, then, in step 606, the method 600 may include correcting for errors by averaging radial motion calculated for each beam. For counter scanning beams, the techniques according to various implementations may be applied similarly by computing the velocity solution separately for each beam and averaging the 3D velocity solution, again cancelling out the erroneous transverse velocity. This approach can be extended to multiple beam origins/sensors, as the average velocity of all sensors should be the vehicle velocity.

Still referring to FIG. 6, if it is determined at step 605 unidirectional, then, in step 607, the method 600 may include correcting for errors by comparing the Doppler values of beams on opposite sides of the true forward velocity vector. For multibeam systems wherein the beams are stacked in the direction of scan, the Doppler-versus-time curve of each beam can be compared by a few methods. For unidirectional scanning wherein the beams have the same direction of scan, the Doppler value of beams on opposite sides of the true forward velocity vector can be compared, only true transverse velocity will result in a non-zero sum greater than the mean Doppler measurement noise.

Still referring to FIG. 6, at step 608, the method 600 may include determining a corrected radial motion of the vehicle. The corrected translation velocity may be based on the error corrections made in step 606 or step 607.

Still referring to FIG. 6, at step 609, the method 600 may include using the corrected radial motion to distinguish between stationary and nonstationary objects in point cloud. At step 610, the method 600 may include removing nonstationary points from the point cloud. At step 611, the method 600 may include extracting features from the point cloud. At step 612, the method 600 may include using the corrected radial motion as initial guess for motion to correlate with any previously extracted features. At step 613, the method 600 may include correlating the extracted features with any previously extracted features. At step 614, the method 600 may include updating a map of stationary features in a 3D environment and placing the vehicle within the environment. The method 600 may be repeated one or more times by proceeding to step 602. At step 615, the method 600 may include outputting a corrected point cloud. The corrected point cloud may be outputted upon completion of all loops through the method 600 or upon each completion of step 614. The corrected point cloud may, but need not be in global coordinates, and may be corrected to a single reference time based on scanning effects such as skew or rolling shutter.

FIG. 7 is a flow chart that illustrates an example method 700 for using data from a plurality of Doppler LIDAR sensors in an automatic vehicle setting to compute and to correct a velocity vector, including both translational velocity and a rotational velocity, of the vehicle and to output a corrected point cloud based on the velocity vector, according to an implementation.

Still referring to FIG. 7, at step 701, the method 700 may be started. Starting the method 700 may include initializing one or more Doppler LIDAR sensors, a computer system 3000 as illustrated in FIG. 30, a chip set 3100 as illustrated in FIG. 31, or any other devices or components described according to various implementations.

Still referring to FIG. 7, at step 702, the method 700 may include collecting Doppler LIDAR data from a plurality of sensors, at least some sensors having different moment arms relative to a center of rotation of a vehicle. According to various implementations, the plurality of sensors may be positioned on or in a vehicle. For example, the plurality of sensors may be positioned on or in a vehicle as components of an autonomous driving system. The plurality of sensors may be positioned in a variety of configurations and may collect Doppler LIDAR data in a variety of ways. Each sensor may scan or sweep along an azimuth angle to collect a series of Doppler LIDAR readings. The direction of the scan or sweep may be unidirectional or bidirectional. Details of unidirectional and bidirectional scanning of one or more sensors is illustrated in FIGS. 8, 9, 10, 11, 12, 13, 14, 15, and 16. According to various implementations, method 700 may be conceptualized as a combination of method 500 and method 600, such that both translation motion and radial motion of the sensors or of a vehicle on which the sensors are mounted is determined, corrected, and utilized to update a point cloud.

Still referring to FIG. 7, at step 703, the method 700 may include generating a point cloud based on the Doppler LIDAR data collected from the plurality of sensors. The point cloud may be generated as described according to any of the various implementations described herein. Each point within the point cloud may be represented by azimuth angle (for example, a left-right angle relative to the sensor), inclination angle (for example, an up-down angle relative to the sensor), range (for example, a distance from the sensor), and a speed component in a direction of a beam emitted from the sensor (for example, a velocity vector).

Still referring to FIG. 7, at step 704, the method 700 may include compute a velocity vector, including radial motion and a translational velocity of the vehicle. The radial motion may be substantially the same as discussed already with respect to step 604 in FIG. 6. The translation motion may be substantially the same as already discussed with respect to step 504 in FIG. 5.

Still referring to FIG. 7, at step 705, the method 700 may include determine a corrected translational velocity of the vehicle. Step 705 may employ the features described in step 505, step 506, step 507, and step 508, as described with respect to FIG. 5.

Still referring to FIG. 7, at step 706, the method 700 may include determining a corrected radial motion of the vehicle. Step 706 may employ the features described in step 605, step 606, step 607, and step 608, as described with respect to FIG. 6.

Still referring to FIG. 7, at step 709, the method 700 may include using the corrected translation velocity and the corrected radial motion to distinguish between stationary and nonstationary objects in point cloud. At step 710, the method 700 may include removing nonstationary points from the point cloud. At step 711, the method 700 may include extracting features from the point cloud. At step 712, the method 700 may include using the corrected translation velocity and the corrected radial motion as initial guess for motion to correlate with any previously extracted features. At step 713, the method 700 may include correlating the extracted features with any previously extracted features. At step 714, the method 700 may include updating a map of stationary features in a 3D environment and placing the vehicle within the environment. The method 700 may be repeated one or more times by proceeding to step 702. At step 715, the method 700 may include outputting a corrected point cloud. The corrected point cloud may be outputted upon completion of all loops through the method 700 or upon each completion of step 714. The corrected point cloud may, but need not be in global coordinates, and may be corrected to a single reference time based on scanning effects such as skew or rolling shutter.

Figure 8A:
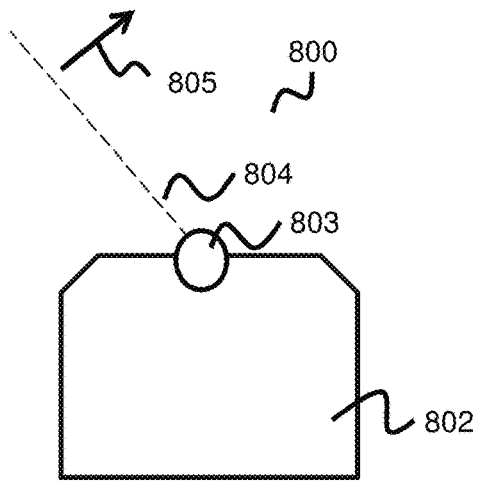
FIG. 8A is a block diagram that illustrates an example system that includes a single, unidirectionally-scanned Doppler LIDAR sensor mounted on a vehicle, according to an implementation.

FIG. 8A is a block diagram that illustrates an example system 800 that includes a single, unidirectional Doppler LIDAR sensor 803 mounted on a vehicle 802, according to an implementation. The sensor 803 is shown emitting a beam 804 that sweeps or scans in a single left-to-right direction 805.

Figure 8B:
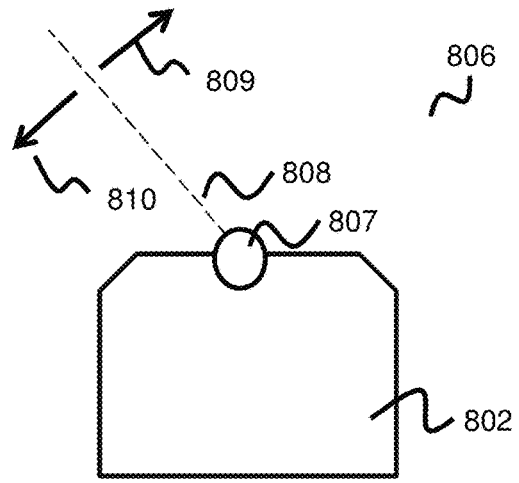
FIG. 8B is a block diagram that illustrates an example system that includes a single, multidirectionally-scanned Doppler LIDAR sensor, specifically a bidirectionally-scanned Doppler LIDAR sensor, mounted on a vehicle, according to an implementation.

FIG. 8B is a block diagram that illustrates an example system 806 that includes a single, multidirectional Doppler LIDAR sensor 807, specifically a bidirectional Doppler LIDAR sensor, mounted on a vehicle 802, according to an implementation. The sensor 807 is shown emitting a beam 808 that sweeps or scans in a first left-to-right direction 809 and a second right to left direction 810.

Figure 9:
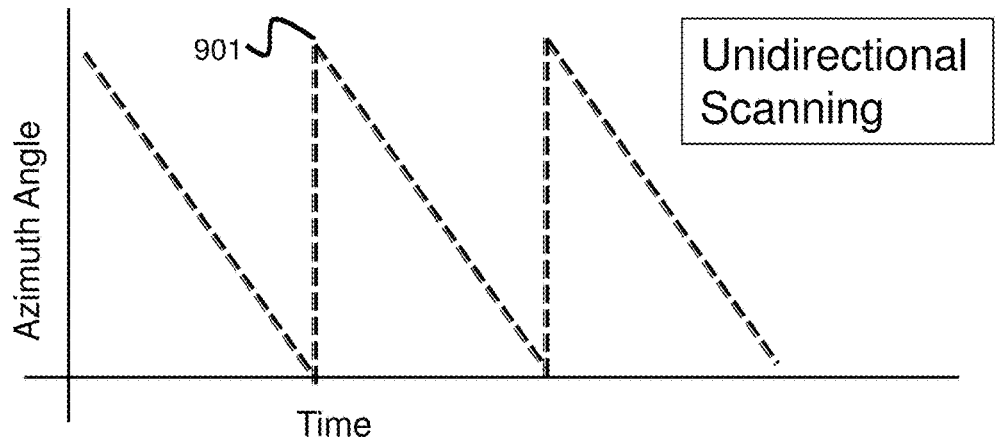
FIG. 9 is a chart illustrating an example plot of azimuth angle over time for a unidirectionally-scanned Doppler LIDAR sensor, used in some implementations.

FIG. 9 is a chart illustrating an example plot of azimuth angle over time for a unidirectional Doppler LIDAR sensor, used in some implementations. Point 901 indicates a reset point at which the unidirectional scanner returns to its original position and begins a new unidirectional scan or sweep. The point 901 is shown as being instantaneous, such as when a fixed beam intersects a rotating polygonal mirror; but, those skilled in the art appreciate that some time may be required for the scanner to return to its original position. The resetting may be accomplished by continuing a rotation in the same direction as the direction of the scan, for example by continuing through a 360-degree rotation. Alternatively, the resetting may be accomplished by performing a rotation in a direction counter to the direction of the scan or sweep.

Figure 10:
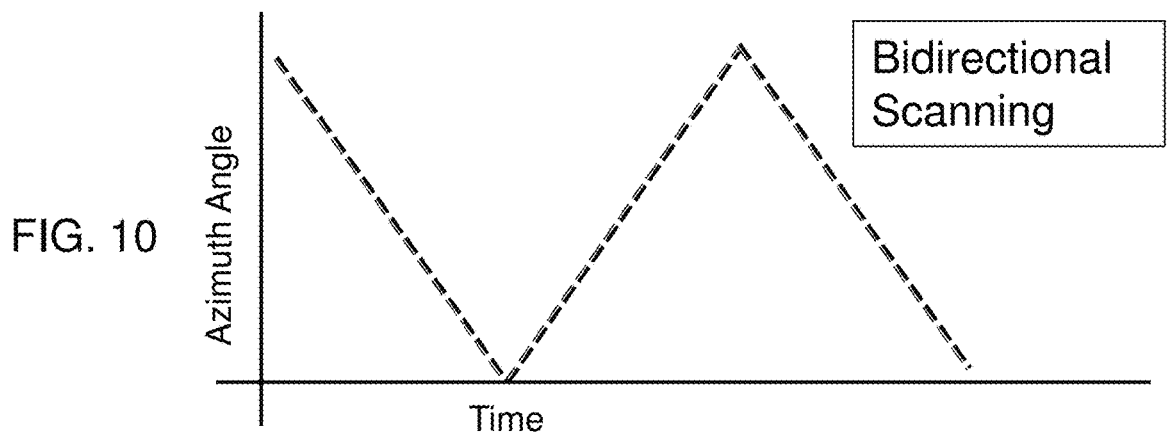
FIG. 10 is a chart illustrating an example plot of azimuth angle over time for a bidirectionally-scanned Doppler LIDAR sensor, used in some implementations.

FIG. 10 is a chart illustrating an example plot of azimuth angle over time for a bidirectional Doppler LIDAR sensor, used in some implementations. Unlike the unidirectional Doppler LIDAR sensor of FIG. 9, no resetting is required. The bidirectional sensor continues scanning as it returns from the extent of its scan or sweep.

Figure 11:
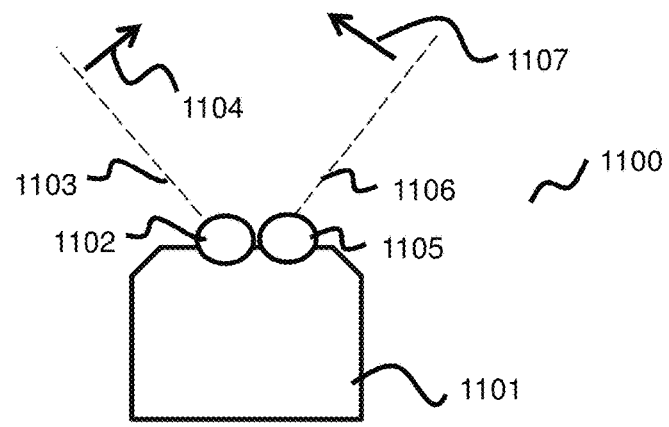
FIG. 11 is a block diagram that illustrates an example system that includes multiple, Doppler LIDAR sensors mounted on a vehicle and scanning concurrently in opposite directions, according to an implementation.

FIG. 11 is a block diagram that illustrates an example system that includes multiple, Doppler LIDAR sensors mounted on a vehicle 1101 and scanning in opposite directions, according to an implementation. A first sensor 1102 is shown emitting a beam 1103 that sweeps or scans in a first left-to-right direction 1104. A second sensor 1105 is shown emitting a beam 1106 that sweeps or scans in a second right-to-left direction 1107.

Figure 12:
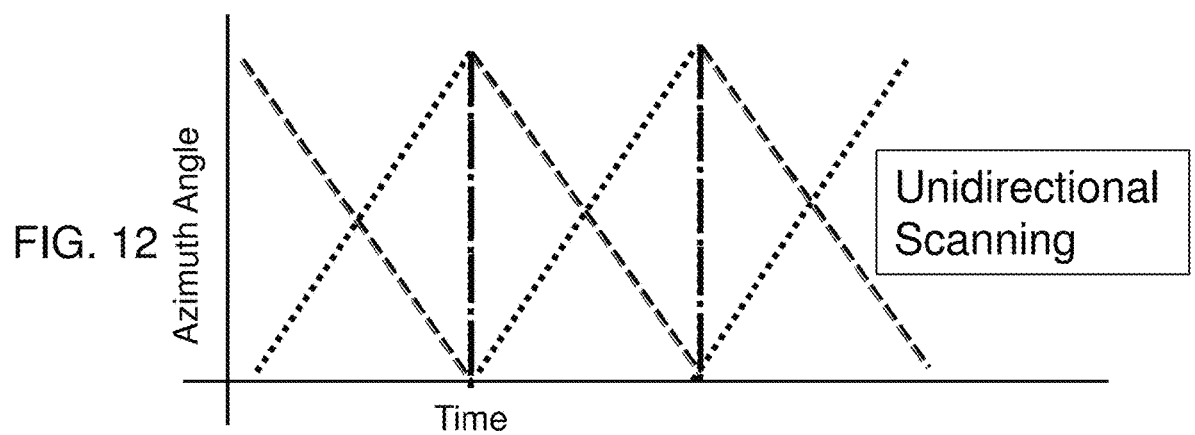
FIG. 12 is a chart illustrating an example plot of azimuth angle over time for a multiple, unidirectional Doppler LIDAR sensors scanning in opposite directions, used in some implementations.
Figure 13:
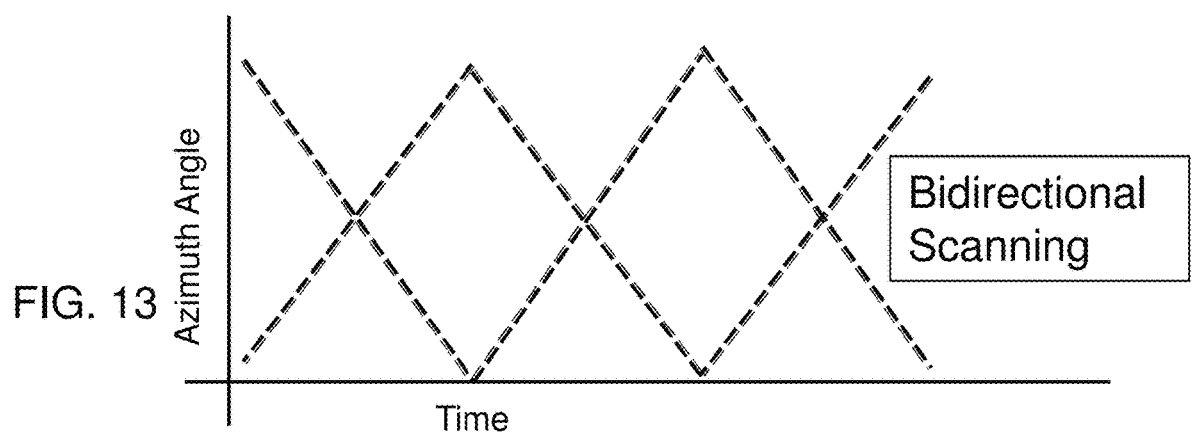
FIG. 13 is a chart illustrating an example plot of azimuth angle over time for a multiple, bidirectionally-scanned Doppler LIDAR sensors scanning concurrently in opposite directions, used in some implementations.

FIG. 12 is a chart illustrating an example plot of azimuth angle over time for a multiple, unidirectional Doppler LIDAR sensors scanning in opposite directions, used in some implementations. FIG. 13 is a chart illustrating an example plot of azimuth angle over time for a multiple, bidirectional Doppler LIDAR sensors scanning in opposite directions, used in some implementations.

Figure 14:
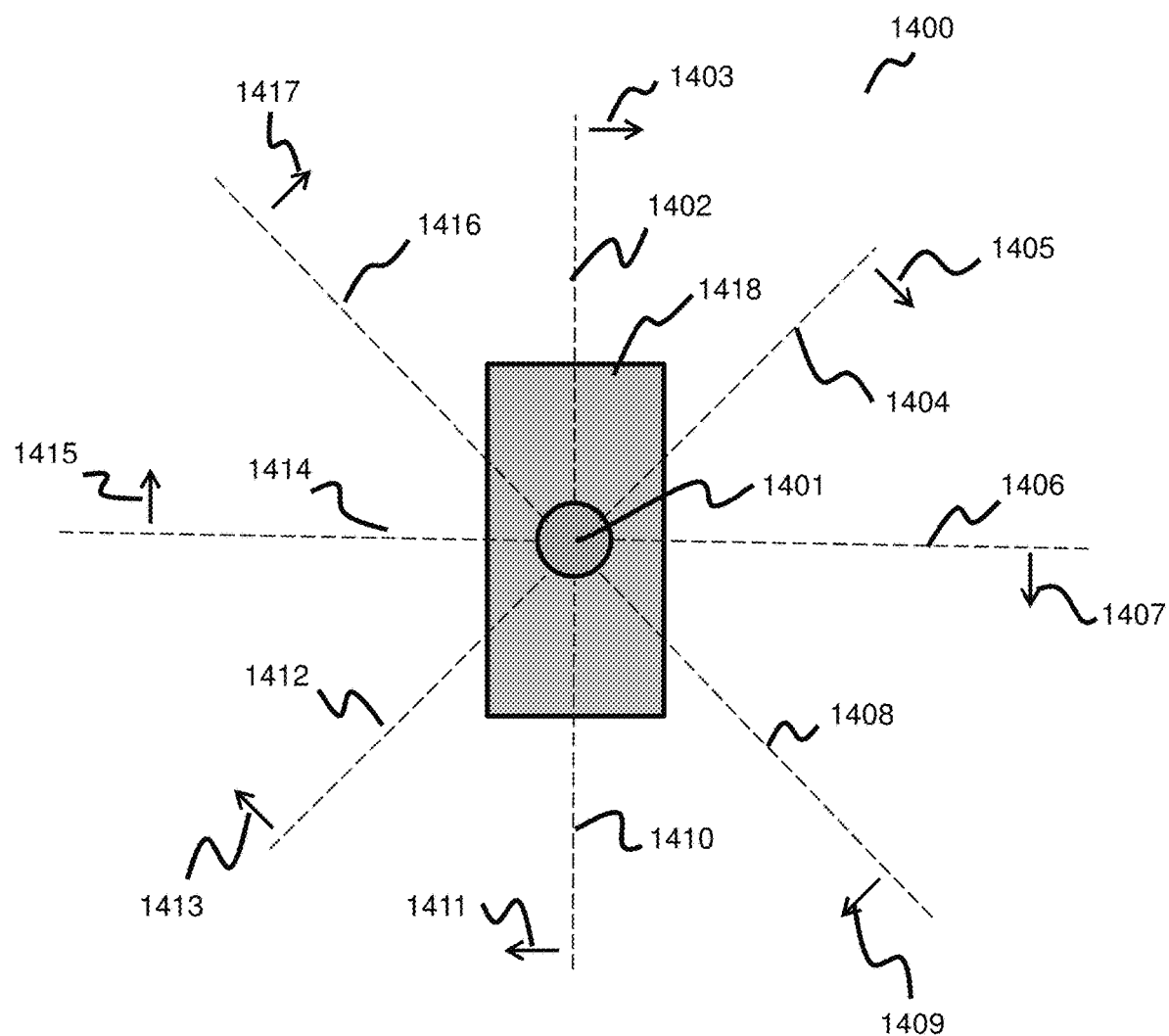
FIG. 14 is a block diagram that illustrates an example system that includes a full 360-degree azimuth scanning Doppler LIDAR sensor mounted on a vehicle, according to an implementation.

FIG. 14 is a block diagram that illustrates an example system 1400 that includes a full 360-degree azimuth scanning Doppler LIDAR sensor 1401 mounted on a vehicle 1418, according to an implementation. The sensor 1401 is shown emitting a first beam 1402 sweeping or scanning in a first direction 1403, a second beam 1404 sweeping or scanning in a second direction 1405, a third beam 1406 sweeping or scanning in a third direction 1407, a fourth beam 1408 sweeping or scanning in a fourth direction 1409, a fifth beam 1410 sweeping or scanning a fifth direction 1411, a sixth beam 1412 sweeping or scanning in a sixth direction 1413, a seventh beam 1414 sweeping or scanning a seventh direction 1415, and an eight beam 1416 sweeping or scanning in an eighth direction 1417. The specific configuration, including the number of beams and their scanning directions is not intended to be limiting; a person having ordinary skill in the art will appreciate that any number of beams scanning in any combination of directions may be employed. In the specific implementation shown in FIG. 14, acceleration effects may be accounted for because for each beam pointing on one direction there is always includes another beam pointing in the opposing direction. Various implementations may employ one or more sensors having beams aimed in opposing directions or approximately opposing directions. Such configurations may be considered to be multidirectional Doppler LIDAR sensors, because the beams are effectively scanning in different directions. For example, comparing the direction 1403 of beam 1402 and the direction 1411 of 1410 shows that direction 1403 is opposed to direction 1411, thereby providing an effectively multidirectional scan.

Figure 15:
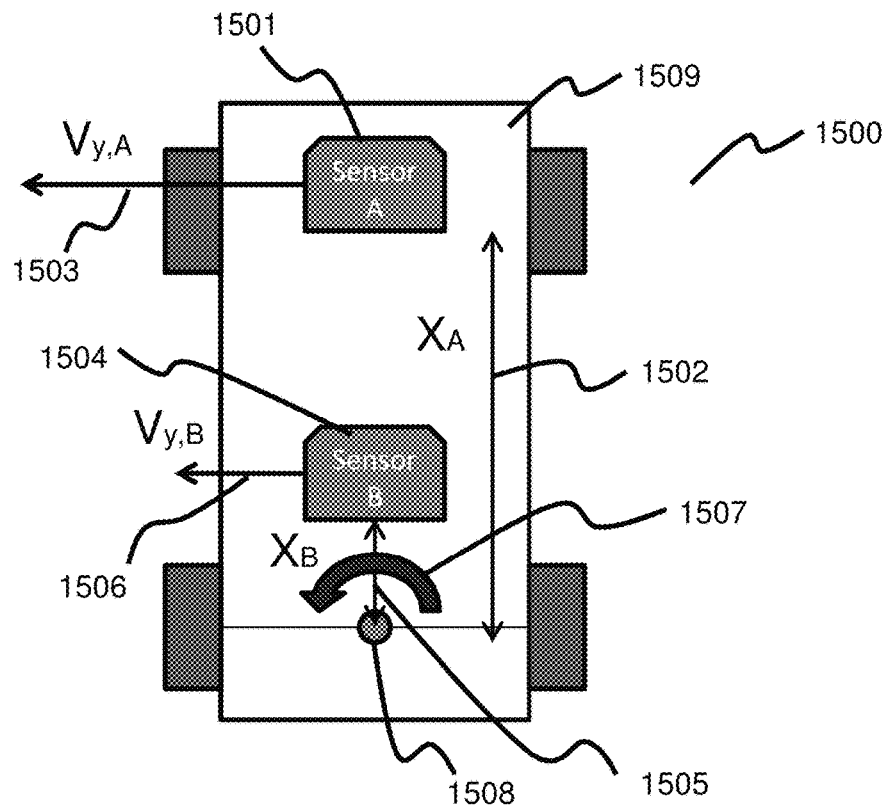
FIG. 15 is a block diagram illustrating an example system that includes a plurality of Doppler LIDAR sensors mounted on a vehicle and having different moment arms relative to a center of rotation of the vehicle, according to some implementations.

FIG. 15 is a block diagram illustrating an example system 1500 that includes a plurality of Doppler LIDAR sensors mounted on a vehicle 1509 and having different moment arms relative to a center of rotation 1508 of the vehicle 1509, according to various implementations. As shown, a first sensor 1501 may be mounted on the vehicle 1509 a first distance 1502 (also referred to as $X_A$ in Expression 6 below) away from the center of rotation 1508. A second sensor 1504 may be mounted on the vehicle 1509 a second distance 1505 (also referred to as $X_B$ in Expression 6 below) away from the center of rotation 1508. As the vehicle 1509 rotates in a direction 1507 about the center of rotation 1508, the first sensor 1501 may have a first instantaneous velocity 1503 (also referred to as $V_{y,A}$ in Expression 6 below) and the second sensor 1504 may have a second instantaneous velocity 1506 (also referred to as $V_{y,B}$ in Expression 6 below).

Figure 16:
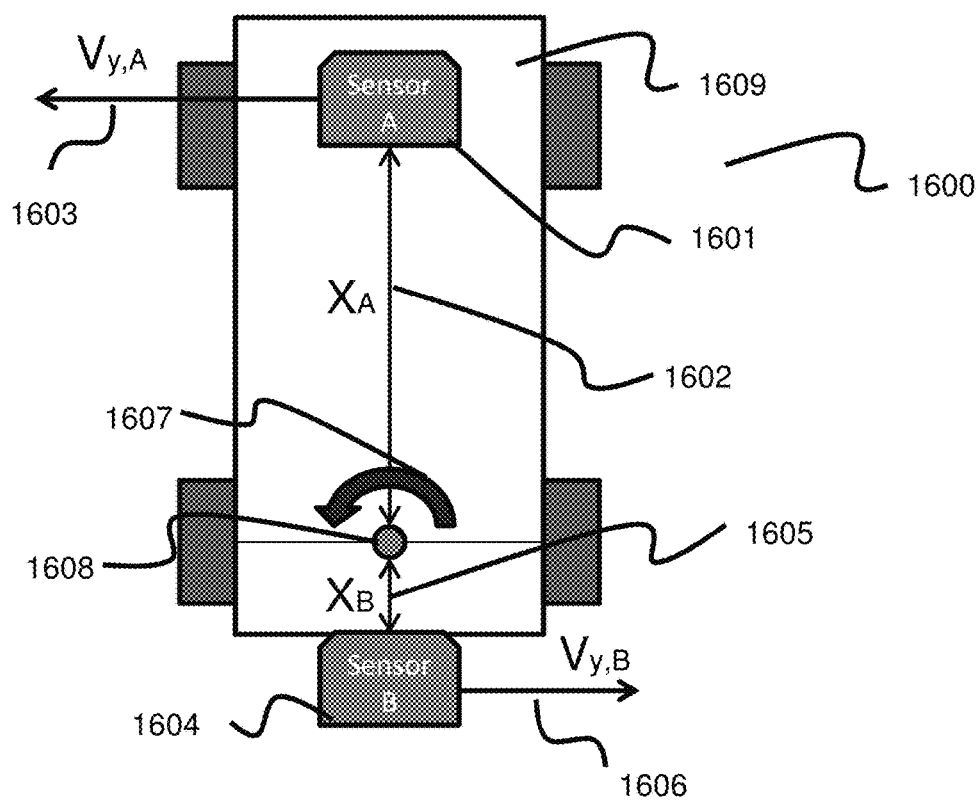
FIG. 16 is a block diagram illustrating an example system that includes a plurality of Doppler LIDAR sensors mounted on a vehicle and having different moment arms relative to a center of rotation of the vehicle, according to some implementations.

FIG. 16 is a block diagram illustrating an example system 1600 that includes a plurality of Doppler LIDAR sensors mounted on a vehicle 1609 and having different moment arms relative to a center of rotation 1608 of the vehicle 1609, according to various implementations. As shown, a first sensor 1601 may be mounted on the vehicle 1609 a first distance 1602 (also referred to as $X_A$ in Expression 6 below) away from the center of rotation 1608. A second sensor 1604 may be mounted on the vehicle 1609 a second distance 1605 (also referred to as $X_B$ in Expression 6 below) away from the center of rotation 1608. As the vehicle 1609 rotates in a direction 1607 about the center of rotation 1608, the first sensor 1601 may have a first instantaneous velocity 1603 (also referred to as $V_{y,A}$ in Expression 6 below) and the second sensor 1604 may have a second instantaneous velocity 1606 (also referred to as $V_{y,B}$ in Expression 6 below).

4.1. Rotational Velocity Solution:

Various implementations provide methods for using Doppler LIDAR sensor data to compute a vehicle's 3D (Cartesian) translational velocity and to correct for errors in the point cloud data resulting from this motion, combined with the scanning operation of the LIDAR sensor(s). Various implementations correct for errors encountered when using a Doppler LIDAR sensor with a single beam origin. By way of non-limiting example, a Doppler LIDAR sensor with a single beam origin may be a combined transmitter/receiver or a closely spaced transmitter/receiver pair. A closely spaced transmitter/receiver pair does not literally have a single beam origin, but for practical purposes may provide similar results and/or may encounter similar issues. Such a Doppler LIDAR sensor with a single beam origin may not be able to differentiate between purely translational vehicle motion and radial/angular motion. Therefore, various implementations account for point cloud errors caused by a vehicle rapidly changing its heading. Various implementations allow the Doppler LIDAR sensor beam(s) to scan over a significant FOV, while accounting for any point cloud projection errors stemming from significant acceleration of the vehicle during the scan period.

According to various implementations, to compute radial motion, a vehicle with either multiple Doppler LIDAR sensors with different lever arms from the vehicle's center of rotation ($L_0$, $L_n$), or a single sensor having multiple beam origins similarly separated may be employed. The vehicle may be presumed to be a rigid body, therefore, according to various implementations, in the absence of sensor noise or error, any difference between the Cartesian components of velocity sensed by properly synchronized Doppler LIDAR beams with origins at differing lever arm distances from the vehicle's center of rotation may be considered to be the result of angular velocity along some other axis or along some combination of axis. For the case of a vehicle with forward axis (X) and transverse axis (Y), the rate of rotation about the perpendicular (Z) axis may be computed from the definition of angular velocity as $$\omega = v_T/r,  \quad (6a)$$

or the ratio of transverse velocity over radius. Practically, this is done by fitting a line in $v_T$ vs $r$ space, where r may be replaced by x for this single-axis, azimuthal radial velocity case. For the case of two sensors on the vehicle, a line-intercept formulation may be used to find the angular frequency (in Hz) as shown in Expression 6b.

$$\omega_z = \frac{v_{y,A} - v_{y,B}}{x_A - x_B} \quad (6b)$$

Where $x_A$ and $x_B$ are the distances in the x direction between each sensor/beam origin and the center of rotation, as illustrated, for example in FIG. 15 and FIG. 16. For many ground vehicles only a single rotational axis, the z-axis for generally azimuthal plane rotation, is expected to evolve rapidly, and the center of rotation (generally the center of the rear axle) is known, so this single axis approach is a valid choice in these applications. The method, according to various implementations, may be generalized to arbitrary numbers of sensor/beam origins and an unknown center of rotation by formulating it as a least-squares minimization problem as shown in Expression 7a.

$$\chi^2 = \sum_{i=1}^{i=N} \left[\frac{(v_{yi,0} - v_{yi,c})}{\sigma_i}\right]^2 = \sum_{i=1}^{i=N} \left[\frac{(v_{yi,0} - (\omega_z x_i + c))}{\sigma_i}\right]^2 \quad (7a)$$

Expression 7a may be solved by conventional chi-squared (or other cost metric) minimization techniques to give the values of the $v_y$ versus x line equation $v_y = \omega_z x + v_{y0}$. The constant $v_{y0}$ in this case is the y velocity at the origin of the coordinate system. If the origin is located at the center of rotation, $v_{y0}$ describes the non-rotational (purely translational) y component of the ego-vehicle velocity.

The azimuthal angular frequency $\omega_z$ may be extracted directly, and the x position of the center of rotation, $x_{cr}$, may be found by simple algebraic manipulation as given by Expression 7b.

$$x_{cr} = -v_{y0}/\omega_z. \quad (7b)$$

For rotation about all three spatial axis, the 3D traverse velocity versus position line equation may be parameterized as shown in Expression 8a through 8c.

$$v_x = v_{z0} + \omega_y z \quad (8a)$$

$$v_y = v_{x0} + \omega_z x \quad (8b)$$

$$v_z = v_{y0} + \omega_x y \quad (8c)$$

Just as in the single axis rotation case, various implementations seek to minimize the sum of the squared error (or other cost metric) between the velocity component measurement at each sensor/beam origin and the computed 3D traverse velocity versus position line equation. From the parameterized line, the vector equation for the sum of the squared error may be represented as shown in Expression 9.

$$f(v_{x0}, v_{y0}, v_{z0}, \omega_x, \omega_y, \omega_z) = \sum_{i=1}^{N} \{[\omega_x(v_{y0} - y_{cr}) - \omega_z(v_{z0} - z_{cr})]^2 + [\omega_y(v_{z0} - z_{cr}) - \omega_z(v_{x0} - x_{cr})]^2 + [\omega_z(v_{x0} - x_{cr}) - \omega_y(v_{y0} - y_{cr})]^2\} \quad (9)$$

Expression 9 may be solved by an orthogonal regression fit using principal component analysis (PCA) of the parameterized velocity data. The vector of angular rates ($\omega_x$, $\omega_y$, $\omega_z$) is given by the coefficients for the first principal component, and the second and third principal components are orthogonal to the first, their coefficients defining directions perpendicular to the traverse velocity line. If the mean of the lever arm lengths and traverse velocity measurements is taken as the centroid for this solution, the intercepts may be algebraically solved to get the center of rotation.

In the above discussion, the 3D velocity solution of each sensor may be formed in the previously described manner for each scanner individually if the array of sensors/beam origins has no overlapping field of view between them, or in the case of multiple (N) overlapping FOVs, a sparse-matrix version of the velocity solution is of the form given by Expression 10a $$Ax = b \quad (10a)$$

For multiple sensors or a sensor with multiple beam origins, the A matrix describes the position of each observed point in the combined field of view (FOV) of N sensors. Specifically, the A matrix is composed of a row for each observed point, with 3*N columns. Each set of three columns (1→3, 4→46, . . . N−2→N) describe the normalized beam vector from the origin of some sensor n≤N to the location of the detected point in ego-vehicle coordinates, where $x_n = A[:, n*3]$, $y_n = A[:, n*3+1]$, $z_n = A[:, n*3+2]$ describe column vectors of the x, y and z coordinates of each point relative to sensor n. x is a 3*N sized column vector where each set of three rows describe the velocity of a sensor in non-normalized units (e.g., m/s or similar); b is a N*n points matrix that contains the radial Doppler measurement for each point relative to each sensor. The N*3 sized state vector x can be computed as shown in Expression 10b. According to such implementations, each line of the A matrix consists of the normalized beam vector between a detected point within the FOV from each sensor/beam origin in succession, and the d matrix, now $n_{points}$ by N columns, has the Doppler value for that location from each sensor. If no detection was made by a given sensor for a row (if it is outside of the FOV or lost due to noise or DSP errors), the columns corresponding to that sensor are set to zero in the subject row.

$$\begin{bmatrix} x_{1,1} & y_{1,1} & z_{1,1} & x_{1,2} & y_{1,2} & z_{1,2} \\ x_{2,1} & y_{2,1} & z_{2,1} & x_{2,2} & y_{2,2} & z_{2,2} \\ \ldots & \ldots & \ldots & \ldots & \ldots & \ldots \\ x_{n,1} & y_{n,1} & z_{n,1} & x_{n,2} & y_{n,2} & z_{n,2} \end{bmatrix} \begin{bmatrix} v_{x,1} \\ v_{y,1} \\ v_{z,1} \\ v_{x,2} \\ v_{y,2} \\ v_{z,2} \end{bmatrix} = \begin{bmatrix} V_{r1,1} & V_{r1,2} \\ V_{r2,1} & V_{r2,2} \\ \ldots & \ldots \\ V_{m,1} & V_{m,2} \end{bmatrix} \quad (10b)$$

The system of equations shown in Expression 10a may be solved by computing the pseudo-inverse of A, finding the state vector $x = (A^T A) A^T b$, and extracting the components of each sensor/beam origin 3D velocity vector. All non-stationary exclusion techniques can be applied identically to the single sensor method.

4.2. Scan Geometry Considerations for Velocity Solutions:

For Doppler LIDAR sensors with a small number of simultaneous beams, some form of scanning—that is, moving the beam(s) over multiple targets while taking an ongoing series of measurements—may be employed, according to various implementations, to cover a significant field of view while maintaining a high angular resolution of the target scene. This may be accomplished in many different ways, but all methods impose constraints on the accuracy of the resultant ego-velocity solution by skewing the resulting measurements, so that some spots represent a target at one time and other spots represents the same target at a later time.

For example, for a single sensor with one or more vertically stacked beams scanning in azimuth (horizontally), acceleration of the vehicle during the scan period is ambiguous with transverse vehicle velocity, because the velocity of the vehicle changes over the period of the scan. In the case of a vehicle accelerating while a single sensor scans from left to right, the Doppler LIDAR returns to the right of the vehicle's velocity vector will have higher values compared to those on the left. This may result in an ego-motion velocity vector erroneously deflected to the right of the true orientation. This can result in erroneous rotation rate solutions, due to apparent, but inconsistent, transverse velocity across different sensor/beam origins. Various implementations solve these issues in various ways, depending on the character of the scan.

For implementations employing a single beam or beams stacked orthogonally to the direction of unidirectional scanning (for example, as illustrated in FIG. 8A and FIG. 9), true transverse velocity can be detected as a discontinuity in velocity measurement when the beam wraps around to the far side of the FOV, as purely forward velocity would have symmetric velocity measurements.

If allowed by the scan mechanism, it is desirable, according to various implementations, to "counter-scan", that is to vary the direction of scan, either sequentially for individual beams (for example, as illustrated in FIG. 8B) or concurrently with multiple beams scanning in opposing directions (for example, as illustrated in FIG. 11). For a single beam or beams stacked orthogonally to the direction of bidirectional "counter" scanning (for example, as illustrated in FIG. 10), the sign of the erroneous transverse velocity will reverse when the direction of scan does, so by averaging the 3D velocity solution across evenly balanced opposing-direction scans the erroneous transverse velocity will cancel out.

For multibeam systems wherein the beams are stacked in the direction of scan (for example, as illustrated in FIG. 11 and FIG. 14), the Doppler-versus-time curve of each beam can be compared by a few methods. For unidirectional scanning wherein the beams have the same direction of scan (for example, as illustrated in FIG. 14), the Doppler value of beams on opposite sides of the true forward velocity vector may be compared, only true transverse velocity will result in a non-zero sum greater than the mean Doppler measurement noise.

For implementations with counter scanning beams, the above technique may be applied similarly by computing the velocity solution separately for each beam and averaging the 3D velocity solution, again cancelling out the erroneous transverse velocity. This approach may be extended to multiple beam origins/sensors, as the average velocity of all sensors should be the vehicle velocity.

4.3. Combined Odometry and Mapping:

All above methods are measurements of a time-derivative value (velocity being change in position and angle rate being change in orientation) and are, therefore, subject to drift due to fine errors, if simply integrated over time to find the position and orientation of the vehicle. Various implementations, therefore, add additional layers of analysis of the point cloud to periodically determine a value for position and orientation based on the shape and reflectivity distribution of the ego-motion compensated point cloud.

A conventional approach to determining position and orientation from LIDAR data is Real-time LIDAR odometry and mapping (LOAM). LOAM seeks to achieve low-drift localization without the need for high accuracy inertial measurements or GPS by decomposing the simultaneous localization and mapping (SLAM) problem into two different algorithms running at disparate frequencies. The first runs at relatively high frequency (typically ~10 Hz) but with low fidelity to estimate the velocity of the (non-Doppler) LIDAR sensor. The second runs more slowly (~1 Hz) and performs fine matching and registration of the point cloud as a batch optimization problem. LOAM and a few variations are described in academic literature, but all implementations to-date have utilized conventional direct-detection-based LIDAR sensors, which lack Doppler measurement capabilities. By providing a direct measurement of vehicle velocity using the Doppler-measurement capabilities of the LIDAR, the accuracy of a Doppler-enabled LOAM algorithm, so-called D-LOAM, can be much higher. Additionally, by using the LIDAR's Doppler measurements to segment out non-stationary objects from consideration for feature generation, the error rate and sensitivity to a surrounding scene may both be drastically reduced.

Figure 17:
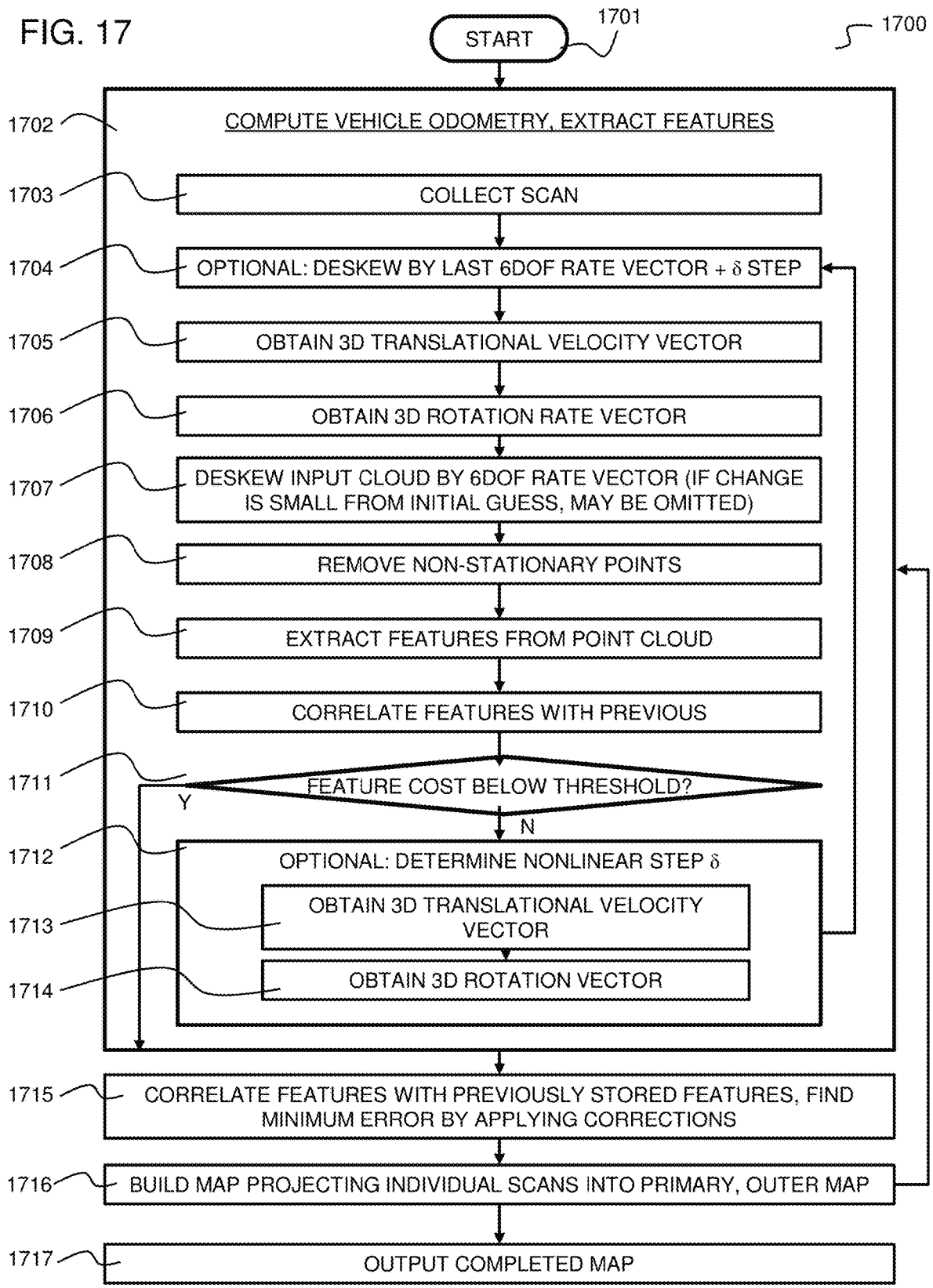
FIG. 17 is a flow chart that illustrates an example a method of Doppler LIDAR Odometry and Mapping (D-LOAM) according to some implementations.

FIG. 17 is a flow chart that illustrates an example a method 1700 of Doppler LIDAR Odometry and Mapping (D-LOAM) according to various implementations. At step 1701, the method 1700 may include an initiation procedure. The initiation procedure may include initializing one or more Doppler LIDAR sensors, a computer system 3000 as illustrated in FIG. 30, a chip set 3100 as illustrated in FIG. 31, or any other devices or components described according to various implementations.

In general, the method 1700 may include a step 1702 of computing vehicle odometry and extract features from a point cloud; a step 1715 of correlating features with previously stored features, minimizing errors by applying corrections; a step 1716 of building a map by projecting individual scans into a primary, outer map; and a step 1717 of outputting a completed map.

The step 1702 of computing vehicle odometry and extract features from a point cloud may include a plurality of sub-steps. At step 1703, the procedure of step 1702 may include collecting a scan from one or more Doppler LIDAR sensors. The Doppler LIDAR sensors may be mounted on a vehicle, such as an autonomous vehicle. The procedure of step 1702 may further include any or all of the following sub-steps, which may be performed once or iterated for a plurality of iterations: step 1704, step 1705, step 1706, step 1707, step 1708, step 1709, step 1710, step 1711, and step 1712. Each of these steps will be discussed individually.

At step 1704, the procedure of step 1702 may optionally include deskewing the collected Doppler LIDAR data by a six-degrees-of-freedom (6DOF) rate vector, which may include a translation velocity vector and a rotational velocity vector for the vehicle as described above according to various implementations. The deskewing may also take into consideration a δ step In this case, δ is a rate-vector (R)

nonlinear step. For the described 6DOF rate vector ($v_x$, $v_y$, $v_z$, $vr_x$, $vr_y$, $vr_z$), δ is ($dv_x$, $dv_y$, $dv_z$, $dvr_x$, $dvr_y$, $dvr_z$). The units of δ are still (m/s, m/s, m/s, radians/sec, radians/sec, radians/sec) as it is not explicitly a time derivative. In the simplest case δ may be computed by finding the distance between each feature and the associated feature in the previous frame, and finding the δ (rate vector step) that minimizes the sum of the squared distances. This can be accomplished by computing the Jacobian matrix, J, of the feature-to-feature distance matrix f relative to the rate vector, $J = \partial f/R$ at the current value of R. The rate-vector step can then be found by $\delta = ((J^T * J + \lambda a * \text{diag}(J^T * J))^{-1}) * J^T * d$, where d is a column vector of the distance between each associated feature and λ is a scalar that controls the relative step size, which can be a small (<1) constant or updated as the solution iterates to control convergence by some algorithm such as scaling λ by the change in the L2-norm of the d matrix from the last iteration.

According to various implementations, step 1704 is part of an iterative loop and, therefore, the 6DOF rate vector and the δ step employed at step 1704 may be those as calculated in a previous pass through the iterative loop. For example, the most recently calculated 6DOF rate vector and the δ step may be used for the deskewing. As used herein, points may be "deskewed" for vehicle ego-motion and/or ego-rotation by adjusting their position in proportion to their collection time relative to a reference time within the scan collection period, most conveniently the beginning, midpoint, or end. This can be accomplished by adding a linearly interpolated position equal to the vehicle velocity vector multiplied by the time reference value and rotating about this point by a spherically linearly interpolated ("slerp'd") amount multiplied by the time reference value via a rotation matrix or quaternion method. For large angles, quaternion methods are more computationally efficient while maintaining accuracy.

At step 1705, the procedure of step 1702 may include obtaining a 3D velocity vector using any of the techniques described above according to various implementations. In conventional LOAM, this is simply a guess, an output from an INU's predictive tracking (non-linear Kalman or similar) filter, or an extrapolated value based on the previous value. For the Doppler LIDAR equipped vehicle, according to various implementations, a direct solution of the vehicle velocity may be computed as described previously. This value may either be used in tandem with an extrapolated value (via a predictive tracking filter), used in tandem with the output of a nonlinear solver (δ), fused with INU data, or any combination of the previous. For example, if the FOV of the Doppler LIDAR on the vehicle is too narrow in the vertical direction to get an accurate solution in the Z direction, undertaking sensor fusion with output from an INU/IMU/Accelerometer to obtain a more accurate estimate of the Z velocity is desirable. If no inertial measurements are available, or the accuracy of said measurements is in question, fusing the output of the previous step via a predictive tracking filter with the current velocity solution output, however noisy, may be beneficial to overall accuracy if the distribution of the noise in the Z measurement is well characterized.

At step 1706, the procedure of step 1702 may include obtaining a 3D rotation rate vector using any of the techniques described above according to various implementations. In conventional LOAM, this is simply a guess, an output from an INU's predictive tracking (Kalman) filter, or an extrapolated value based on the previous value. Just as for the linear velocity vector, the rotational velocity solution may be computed, according to various implementations, from Doppler LIDAR data. The computed rotational velocity solution may then be used in tandem with an extrapolated value (via a predictive tracking filter), used in tandem with the output of a nonlinear solver (δ), fused with INU data, or any combination of the previous. If the vehicle has only a single origin Doppler LIDAR sensor or not enough FOV for a rotational solution, the conventional LOAM step may be used alone.

At step 1707, the procedure of step 1702 may include deskewing an input cloud by the 6DOF rate vector. If the change is small relative to an initial guess, this deskewing may be omitted. The same operation described in step 1704 may be employed, but the improved 6DOF change vector may be used.

At step 1708, the procedure of step 1702 may include removing non-stationary points using any of the techniques described according to various implementations. With an improved 6DOF sensor velocity, for example from step 1705 and step 1706, points with non-world-stationary Doppler values may be removed. Optionally, according to various implementations, this removal of non-world-stationary Doppler values may instead be done during feature extraction, described below in step 1709.

At step 1709, the procedure of step 1702 may include extracting features from the point cloud using any of the techniques described according to various implementations. Various conventional methods based on hand-tuned or machine learning may also be utilized to extract spatially and temporary stable features from the point cloud. These vary from a convolutional neural network (CNN) trained on inertial navigation unit (INU) ground truths to edge, line, plane, 2D and 3D corner extraction. Various implementations function on semantically-filtered edge and plane extraction. In this scheme a Doppler-enhanced range derivative region growing algorithm may be utilized to segment objects apart from the road. The edges of non-ground objects may be found, filtered for Doppler, filtered for minimum range prominence, filtered for occlusion, and used as keypoints for XY translation and azimuth angle by a point-to-line distance metric. Optionally, larger objects may also have planar surfaces extracted by a smoothness metric and used for translation and azimuth by a point-to-plane distance metric. Finally, the ground plane may have planar surfaces extracted by a smoothness metric and used for Z translation and roll/pitch angle by a point-to-plane distance metric.

At step 1710, the procedure of step 1702 may include correlating features with previously determined features using any of the techniques described according to various implementations. Using metrics explained above or similar, it is possible according to various implementations to compute the cost of the current solution, compared to the previous solution. If a sum of feature cost is below threshold, then at step 1711, the procedure of step 1702 may include breaking from the iterative loop and proceeding to the next step and/or returning a value for vehicle localization and pose. As used in this context, "pose" refers to the position and orientation of the vehicle.

At step 1712, the procedure of step 1702 may optionally include determining a nonlinear step δ using any of the techniques described according to various implementations. According to various implementations, a Levenberg-Marquardt optimization may be employed and a best-guess change to the vehicle localization and pose (position and orientation) may be computed based on a matrix composed of the cost metric for each feature, and a nonlinear step δ is computed. At step 1713, the procedure of step 1712 may include obtaining a 3D translational velocity vector for the vehicle using any of the techniques described according to various implementations. At step 1714, the procedure of step 1712 may include obtaining a 3D rotation rate vector using any of the techniques described according to various implementations. Upon completion of step 1712 execution of the method may return to step 1704 one or more times or may proceed to step 1715.

At step 1715, the method 1700 may include correlating features with previously stored features, find minimum error by applying corrections using any of the techniques described according to various implementations. According to various implementations step 1715 may include using similar procedures as described with respect to step 1710, step 1711, and step 1712. According to various implementations, an iterative closest point (ICP) procedure or a similar procedure may be employed in step 1715. ICP, for example, is a known algorithm used to minimize the difference between two clouds of points.

At step 1716, the method 1700 may include building a map projecting individual scans into a primary, outer map. The method 1700 may return to step 1702 until the map is complete. Finally, at step 1717, the method 1700 may include outputting a completed map.

Figure 18:
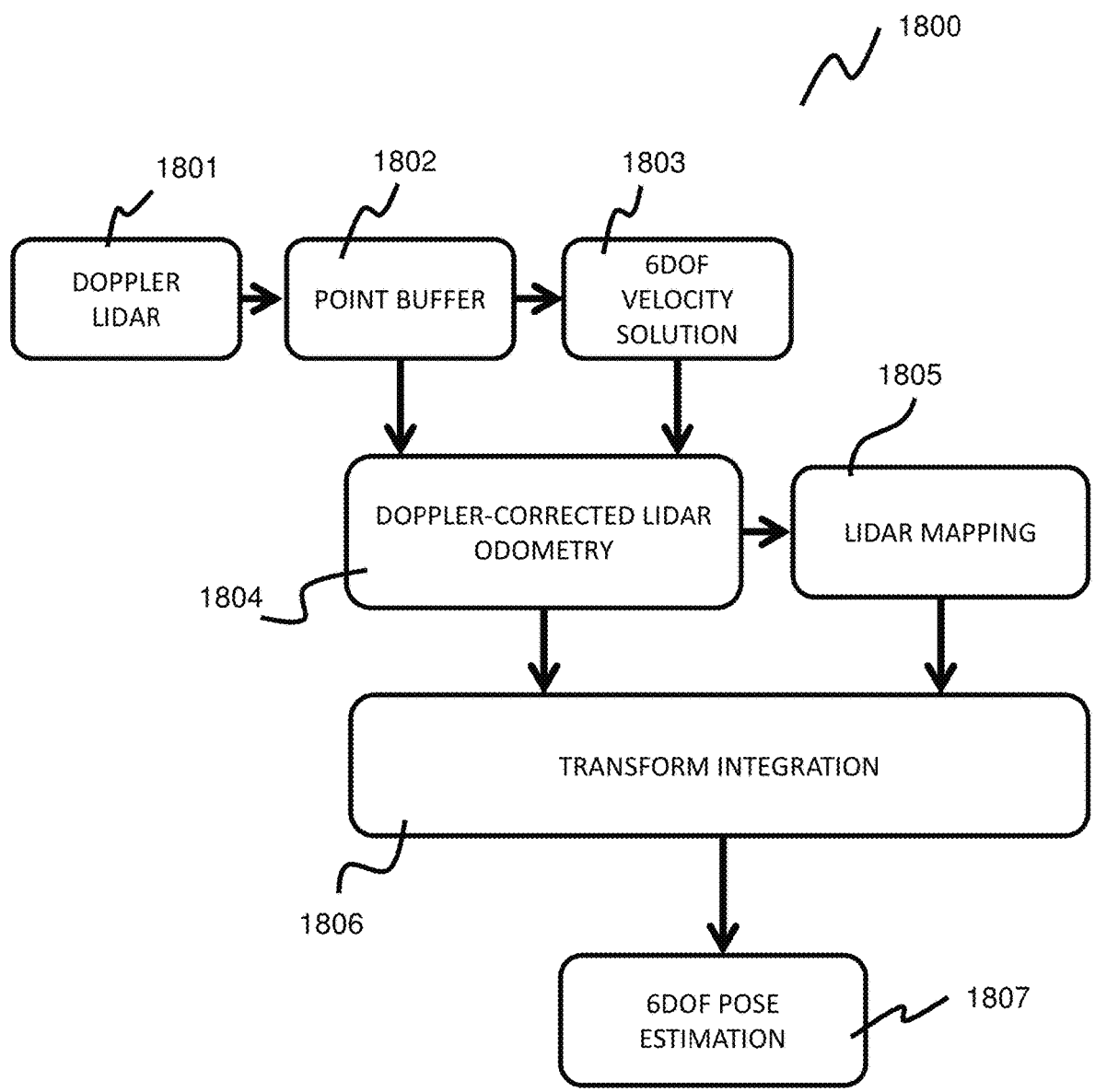
FIG. 18 is a flow chart that illustrates an example method for using data from Doppler LIDAR sensors in an automatic vehicle setting to compute a pose estimation of the vehicle having 6 degrees of freedom, according to some implementations.

FIG. 18 is a flow chart that illustrates an example method 1800 for using data 1801 from Doppler LIDAR sensors in an automatic vehicle setting to compute a pose estimation 1808 of the vehicle having 6 degrees of freedom, according to various implementations.

At step 1801, the method 1800 may include obtaining Doppler LIDAR data 1801 from one or more sensors using any of the techniques described according to various implementations. At step 1802, the method 1800 may optionally include passing the Doppler LIDAR data 1801 through a point buffer 1802. The point buffer 1802 serves to generate a point cloud. The point buffer 1802 may collect a plurality of frames of Doppler LIDAR data over a period of time and group the data sequentially. At step 1803, the method 1800 may include utilizing the point cloud and/or the Doppler LIDAR data 1801 to calculate a 6 DOF velocity vector for the vehicle using any of the techniques described above according to various implementations. At step 1804, the method 1800 may include utilizing the 6 DOF velocity vector and the point cloud to perform Doppler-corrected LIDAR odometry using any of the techniques described above according to various implementations. At step 1805, the method 1800 may include performing a LIDAR mapping to deskew the Doppler LIDAR point cloud from a local coordinate system associated with the one or more sensors and/or the vehicle to a global coordinate system based on the surrounding environment. At step 1806, the method 1800 may include performing a transform integration using any of the techniques described according to various implementations. The transform integration may combine the results of the Doppler-Corrected LIDAR odometry obtained at step 1804, which are in local coordinates, with the LIDAR mapping obtained at step 1805. At step 1807, the method 1800 may include placing the one or more sensors and/or the vehicle within the global coordinate system to provide an accurate 6 DOF pose estimation.

Figure 19:
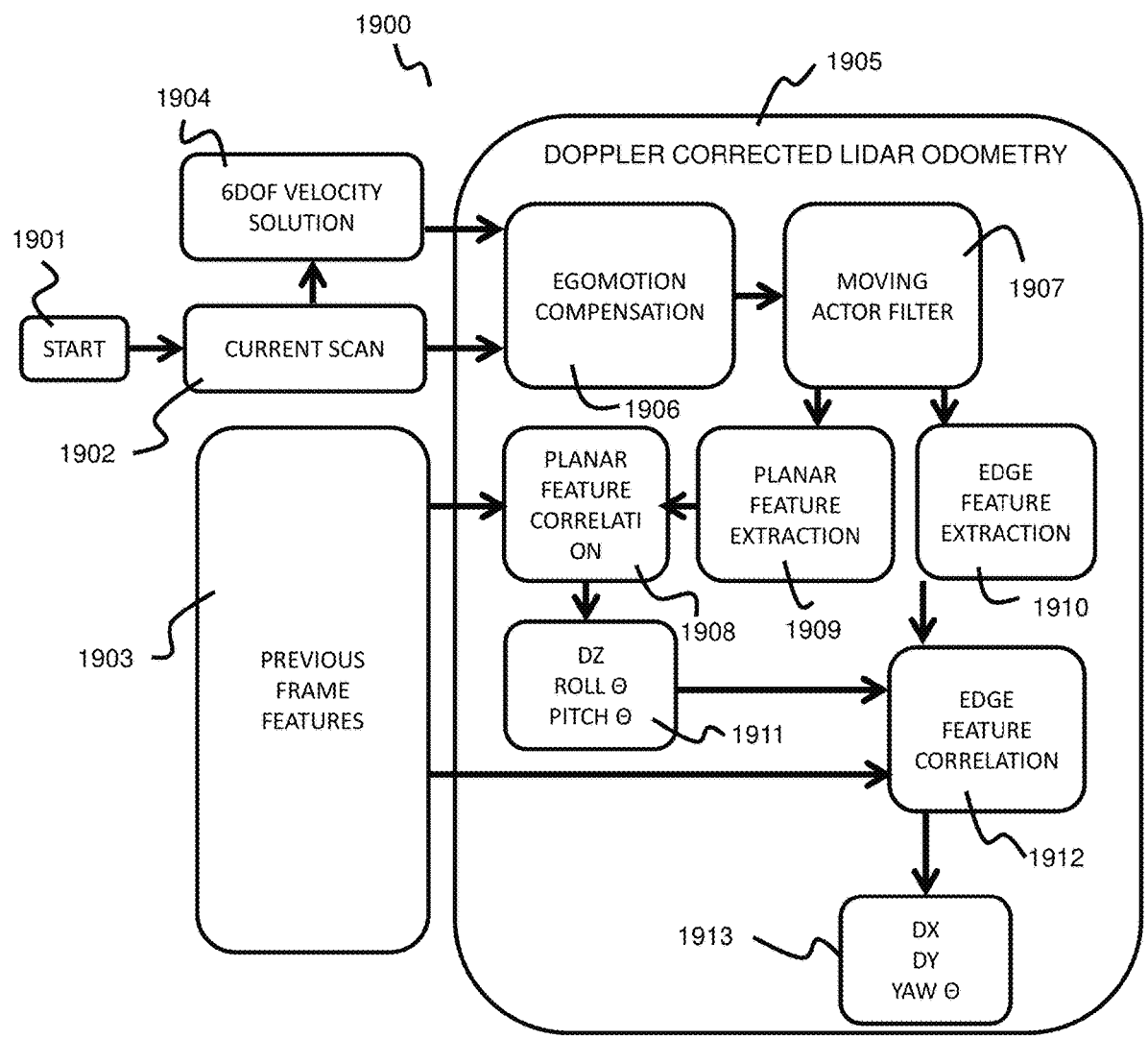
FIG. 19 is a flow chart that illustrates an example method of Doppler LIDAR-corrected odometry, according to some implementations.

FIG. 19 is a flow chart that illustrates an example method 1900 of Doppler LIDAR-corrected odometry, according to various implementations. At step 1901, the method 1900 may include an initiation procedure. The initiation procedure may include initializing one or more Doppler LIDAR sensors, a computer system 3000 as illustrated in FIG. 30, a chip set 3100 as illustrated in FIG. 31, or any other devices or components described according to various implementations. At step 1902, the method 1900 may include collecting current scan data from one or more Doppler LIDAR sensors. At step 1903, the method 1900 may include utilizing frame features from a previous iteration of a Doppler LIDAR-corrected odometry procedure using any of the techniques described above according to various implementations. At step 1904, the method 1900 may include calculating a 6 DOF velocity vector for the one or more sensors and/or for the vehicle using any of the techniques described above according to various implementations. Information from any or all of step 1902, 1903, and 1904 may be utilized in step 1905, which details various procedures that may be employed, according to various implementations, to perform Doppler LIDAR-corrected odometry.

At step 1906, the procedure of step 1905 may include performing an ego-motion compensation using any of the techniques described above according to various implementations. For example, according to various implementations, ego-motion compensation may be accomplished by extrapolating the position and orientation (pose) of the ego-vehicle at the time stamp of each collected LIDAR point by numerical integration of the rate vector, and the location of the point geometrically altered in accordance with this extrapolated ego-vehicle pose. This geometric transform can be applied by methods for interpolating rotation matrices such as the Rodrigues formula, or by spherical linear interpolation of the quaternion describing the orientation of the ego-vehicle. In either case, position can be linearly or exponentially interpolated by conventional means. The compensation for vehicle ego-motion may be applied in various implementations to some combination of fields in the Doppler LIDAR point cloud data, including measured range, azimuth and elevation data fields, as well as the measured Doppler or radial velocity field.

At step 1907, the procedure of step 1905 may include applying a moving actor filter using any of the techniques described according to various implementations. For example, according to various implementations, applying the moving actor filter may include computing the ground-frame velocity of each point (so-called "compensated Doppler" by means previously described, and removing any points with a value beyond a set threshold from consideration for feature extraction. A more robust approach may apply a region-growing or density-based clustering algorithm such as DBSCAN, with each above-threshold point as a cluster seed. When region-growing cannot continue beyond its epsilon value (either a 3D distance, Doppler differential, or combination of other feature costs), all points present in cluster regions are removed from consideration for feature extraction. This approach allows non-moving sections of moving objects (such as the weight-bearing leg of a pedestrian mid-stride) to be removed; but, may involve careful tuning or further processing to prevent regions/clusters from erroneously growing into adjacent truly stationary objects.

At step 1908, the procedure of step 1905 may include performing a planar feature correlation using any of the techniques described according to various implementations. For example, according to various implementations, the planar feature correlation may include identifying the three closest planar points from the previous scan/frame within some distance tolerance. The equation of the plane spanning these three points is computed, and the shortest vector between the subject point and the generated plane is solved for. Alternatively, if a RANSAC approach is utilized, the extracted planes may be stored directly and subject point to plane vector similarly computed. Another option is to generate a mesh on the surface of the previous point cloud by Delaunay triangulation or similar, and compute point-to-plane distances between subject points and the plane described by the closest set of three mesh vertices within some distance threshold.

At step 1909, the procedure of step 1905 may include performing a planar feature extraction using any of the techniques described according to various implementations. For example, according to various implementations, the planar feature correlation may include identifying points with low variability in range with their neighbors by calculating a windowed average of the range derivative between a point and its neighbors, and selecting points below some threshold as planar candidates. Alternatively, a RANSAC operation can be used to find planar regions; but, such an approach is more likely to fail to find small planar features amongst clutter.

At step 1910, the procedure of step 1905 may include performing an edge feature extraction using any of the techniques described according to various implementations. For example, according to various implementations, the edge feature extraction may include identifying points with high variability in range compared to their neighbors by calculating a windowed average of the range derivative between a point and its neighbors, and selecting points above some threshold as edge candidates, or identifying discontinuities in the range derivative that would indicate a sudden change in the intersection angle of the LIDAR's beam with the scene. Edges may then be processed to filter out edges caused by occlusion, for example by setting a criterion that the candidate point have no closer points within some angular tolerance.

At step 1911, the procedure of step 1905 may include calculating a radial velocity vector (dz) including a roll and a pitch, using any of the techniques described according to various implementations. In some cases it may be desirable to only utilize a feature to solve for some smaller subset of the full rate vector. For example, planar features extracted from the ground plane may not provide useful information about the azimuth angle of the ego-vehicle if little variation of the ground plane topology exists in the azimuthal direction; but may provide useful information about the z velocity, roll and pitch rates. This can be accomplished by iterative convergence to minimize the feature-to-feature mean squared distance as before, but utilizing the reduced-dimensionality rate vector [vz, vrx, vry] in place of the full rate vector. The rate vector nonlinear step $\delta$ is again found by computing the Jacobian matrix, J, of the feature-to-feature distance matrix $f$ relative to the reduced dimensionality rate vector, $Jr=\partial f/R$ at the current value of R. The rate-vector step can then be found by $\delta=((Jr^T*Jr+\lambda*\text{diag}(Jr^T*Jr))^{-1})*Jr^T*d$, where d is a column vector of the distance between each associated feature, and $\lambda$ is a scalar that controls the relative step size, which can be a small (<1) constant or updated as the solution iterates to control convergence by some algorithm such as scaling $\lambda$ by the change in the L2-norm of the d matrix from the last iteration.

At step 1912, the procedure of step 1905 may include performing an edge feature correlation using any of the techniques described according to various implementations. For example, according to various implementations, the edge feature correlation may include identifying the two closest edge features from the previous scan to each subject edge feature in the current scan within some distance threshold, computing the equation of a line between the two previous features, and solving for the shortest vector between said line and the subject edge point.

At step 1913, the procedure of step 1905 may include calculating a translation velocity vector (including, for example, dx, dy, and yaw) using any of the techniques described according to various implementations. These terms are identical to those described above, but with a rate vector composed of dx, dy, and yaw instead. This may be desirable for edge features such as vertical corners on large structures, as they provide little information about the z component of the vehicle's rate vector.

Figure 20:
FIG. 20 is an example according to some implementations illustrating raw data from a Doppler LIDAR system prior to ego-motion deskewing.
Figure 21:
FIG. 21 is an example according to some implementations illustrating data from a Doppler LIDAR system after ego-motion deskewing.

FIG. 20 is an example according to various implementations illustrating raw data from a Doppler LIDAR system prior to ego-motion deskewing. The raw data was taken over a period of time, while the vehicle on which the Doppler LIDAR system was mounted was in motion. Therefore, the point cloud appears skewed due to errors caused by the translation velocity of the vehicle. FIG. 21 is an example according to various implementations illustrating the data from the Doppler LIDAR system, as shown in FIG. 20, after ego-motion deskewing. The deskewing employed, according to various implementations, may utilize Doppler data available for each point in the point cloud to project the points back in time, based on the velocity measurement for each point, to arrive at a deskewed point cloud as shown in FIG. 21. The deskewing yields a point cloud in which the points are positioned as though they were captured at a single instant of time, thereby compensating for the motion of the vehicle. Note that a tree with a single trunk, evident in FIG. 21 after deskewing, appears to have at least two trunks in FIG. 20, before deskewing. Also note that a level surface in FIG. 21, after deskewing, appears sloped in FIG. 20, before deskewing.

Figure 22:
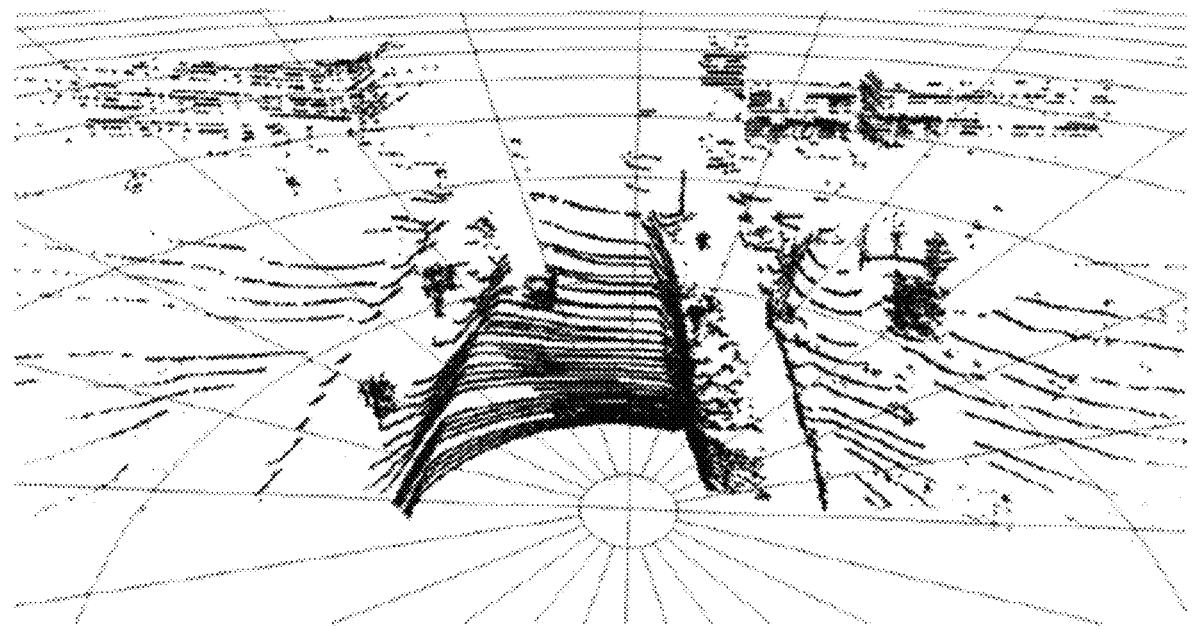
FIG. 22 is an example according to some implementations illustrating a single frame of Doppler LIDAR data with raw radial velocity shading, according to which darker colors represent faster radial motion relative to the sensor and lighter colors represent slower radial motion relative to the sensor.
Figure 23:
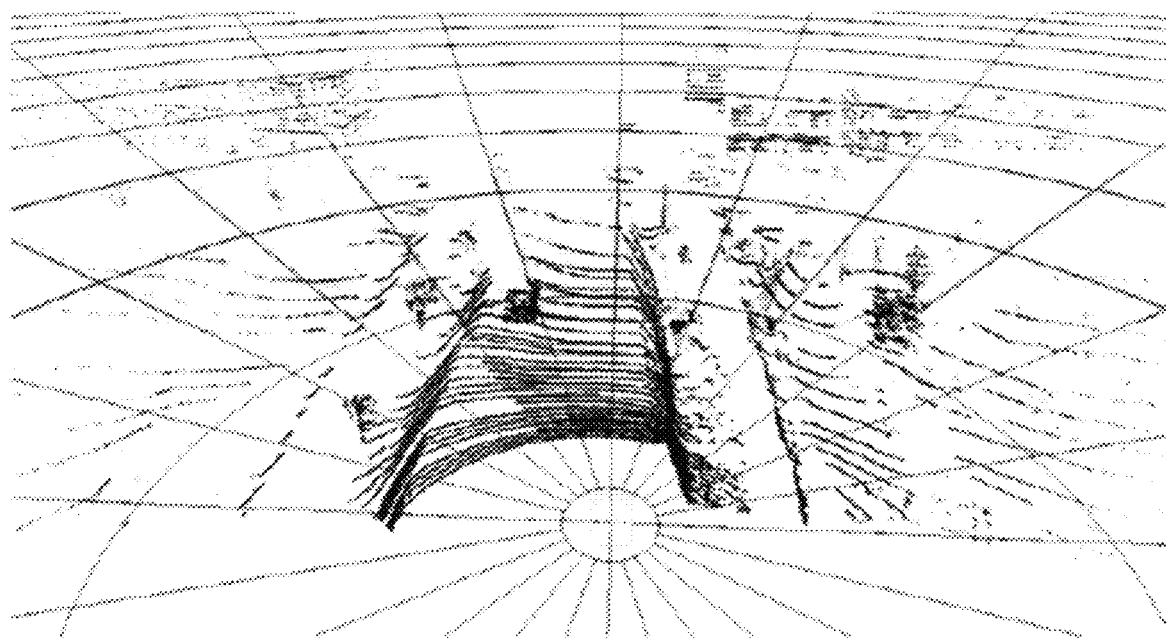
FIG. 23 is an example according to some implementations illustrating the single frame of Doppler LIDAR data from FIG. 22 after correction, including ego-motion radial velocity shading, according to which darker colors represent faster motion relative to the earth frame, and lighter colors represent slower motion relative to the earth frame.

FIG. 22 is an example according to various implementations illustrating a single frame of Doppler LIDAR data with raw radial velocity shading, according to which darker colors represent faster radial motion and lighter colors represent slower radial motion. FIG. 23 is an example according to various implementations illustrating the single frame of Doppler LIDAR data from FIG. 22 after correction, including ego-motion radial velocity shading, according to which darker colors represent faster motion relative to the earth frame, and lighter colors represent slower motion relative to the earth frame. Note that the road surface has become stationary and a single moving car is evident in FIG. 24, in contrast to the heavy relative emotion in FIG. 22.

Figure 24:
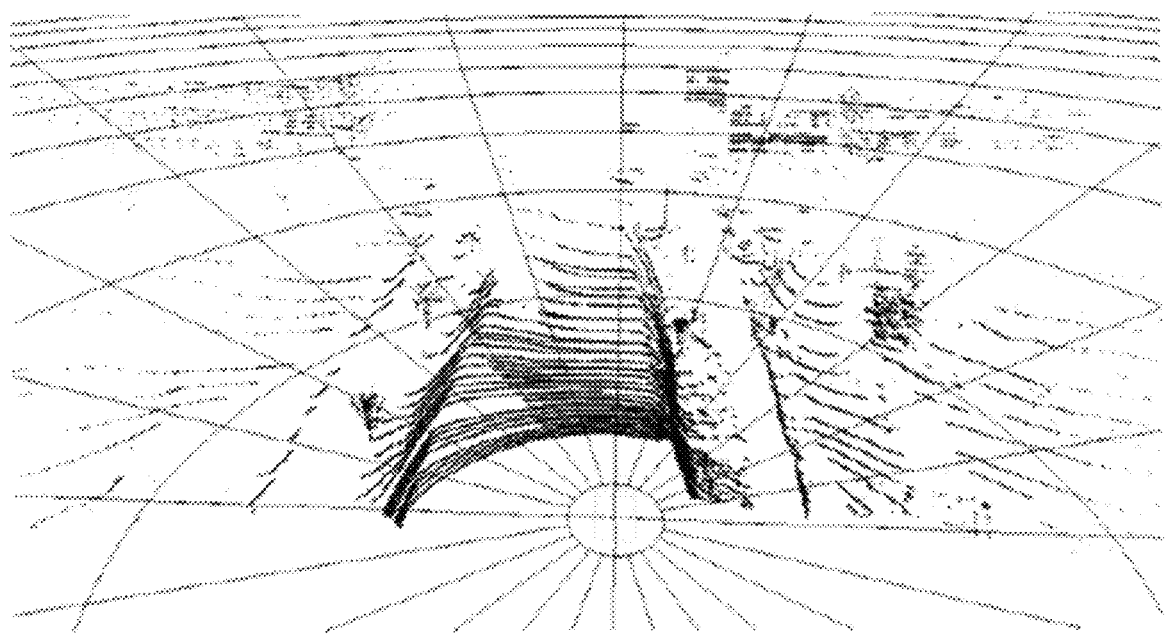
FIG. 24 is an example according to some implementations illustrating the single frame of Doppler LIDAR data from FIG. 23 after further correction, according to which points exceeding a velocity threshold relative to the earth reference frame have been deleted, leaving only the stationary objects in the scene.
Figure 25:
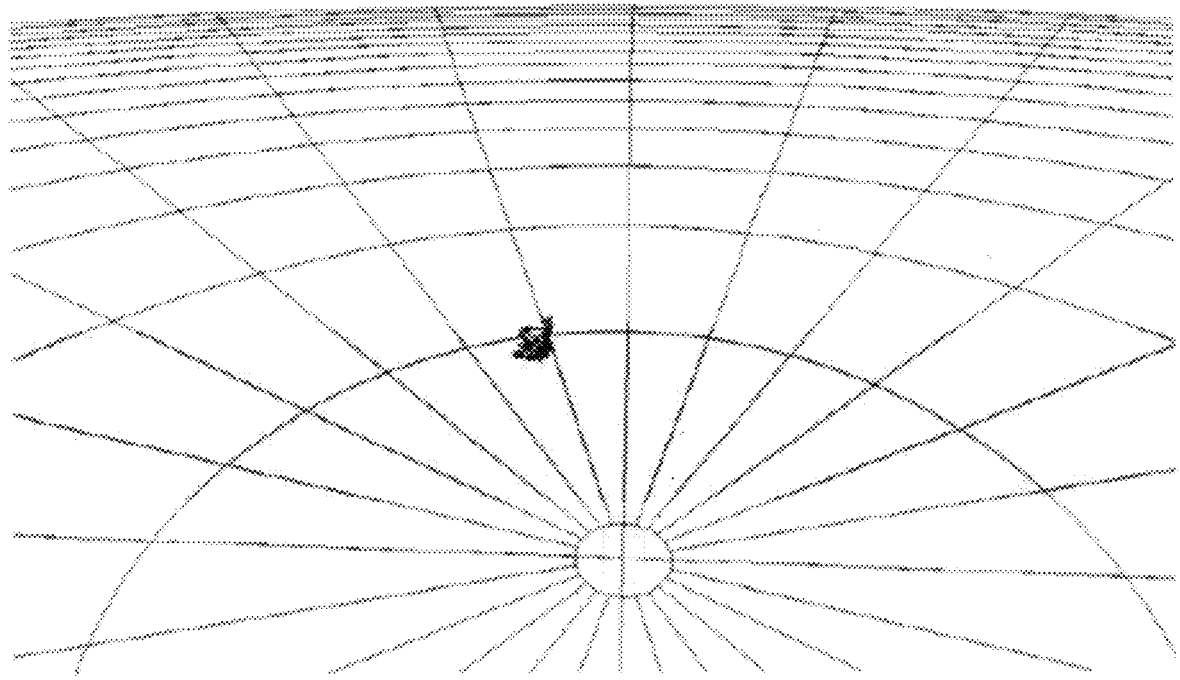
FIG. 25 is an example according to some implementations illustrating the single frame of Doppler LIDAR data from FIG. 23 after further correction, according to which points below the velocity threshold relative to the earth reference frame have been deleted, leaving only the non-stationary objects in the scene.

FIG. 24 is an example according to various implementations illustrating the single frame of Doppler LIDAR data from FIG. 23 after further correction, according to which points exceeding a velocity threshold relative to the earth reference frame have been deleted, leaving only the stationary objects in the scene. Thus the moving car is removed leaving the road surface and curbs. FIG. 25 is an example according to various implementations illustrating the single frame of Doppler LIDAR data from FIG. 23 after further correction, according to which points below the velocity threshold relative to the earth reference frame have been deleted, leaving only the non-stationary objects in the scene, evident as an approaching car.

Figure 26:
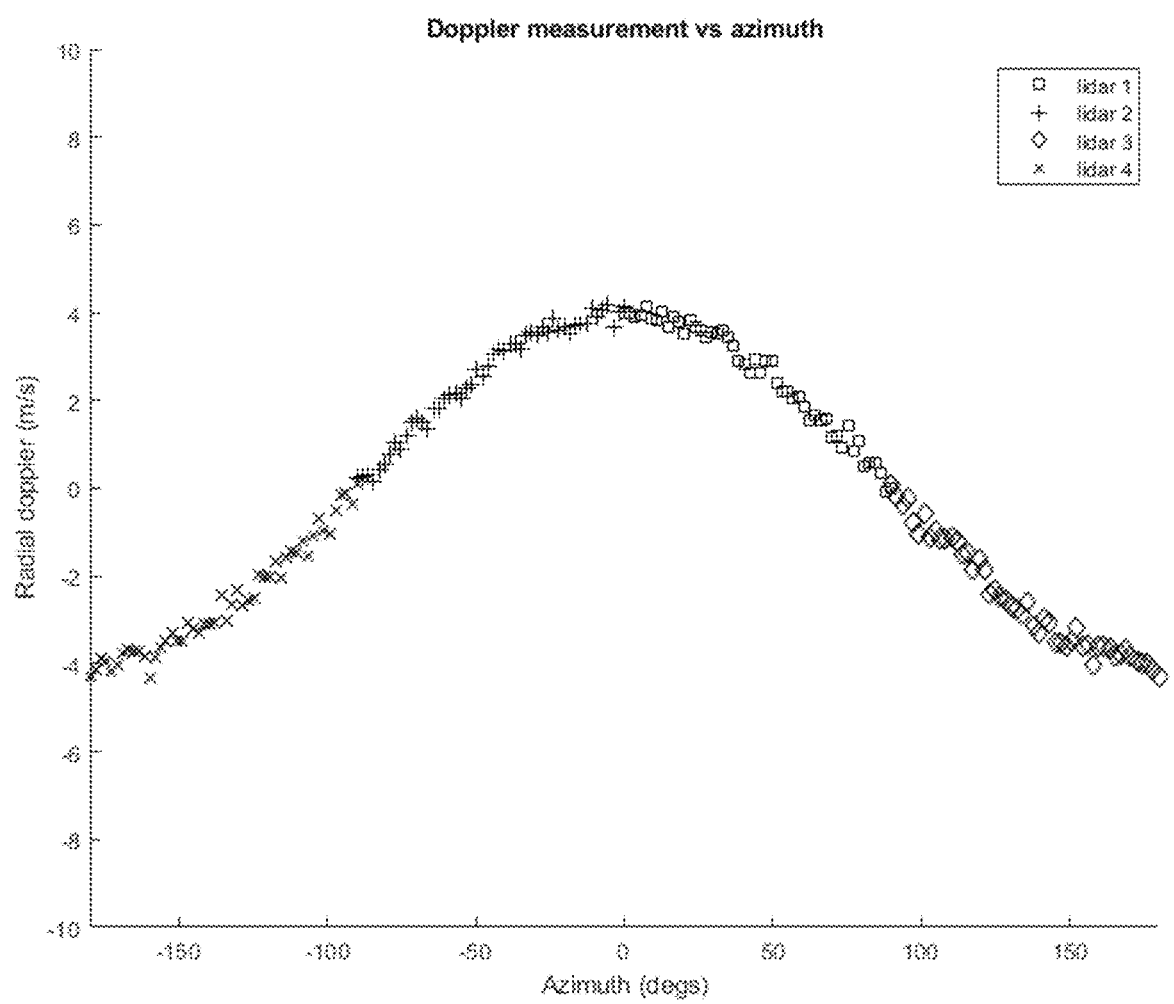
FIG. 26 is an example according to some implementations illustrating a plot of Doppler LIDAR measurements versus azimuth angle for four 120-degree field of view LIDAR sensors evenly spaced on a vehicle with different moment arms for each sensor, with the vehicle in uniform forward translational motion.
Figure 27:
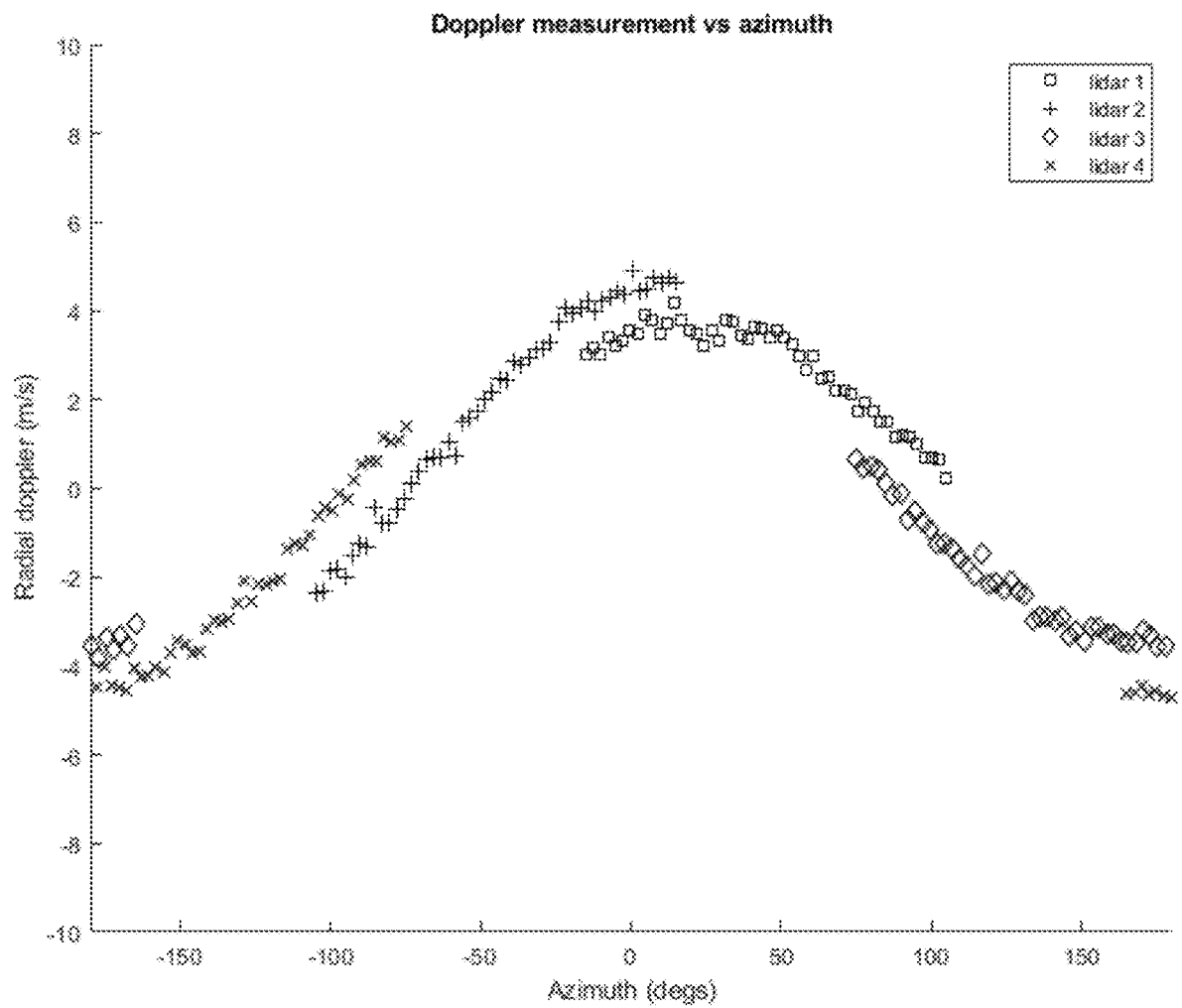
FIG. 27 is an example according to some implementations illustrating a plot of Doppler LIDAR measurements versus azimuth angle for the four 120-degree field of view LIDAR sensors evenly spaced on the vehicle with different moment arms for each sensor, as described in FIG. 26, but wherein the vehicle is turning at a rate of 36 degrees per second.

FIG. 26 is an example according to various implementations illustrating a plot of Doppler LIDAR measurements versus azimuth angle for four 120-degree field of view LIDAR sensors evenly spaced (90 degrees apart on the corners of a vehicle) in uniform forward motion at 12 m/s. Note the symmetry around the forward direction (azimuth 0) and smooth continuity at left and right 180 degrees. A sinusoidal fit through these points gives the velocity of the vehicle. FIG. 27 is an example according to various implementations illustrating a plot of Doppler LIDAR measurements versus azimuth angle for the four 120-degree field of view LIDAR sensors evenly spaced on the vehicle, as described in FIG. 26, but wherein the vehicle is turning at a rate of 36 degrees per second. Each sensor describes a different curve that would be fit with different sinusoids indicating different average velocities.

Figure 28:
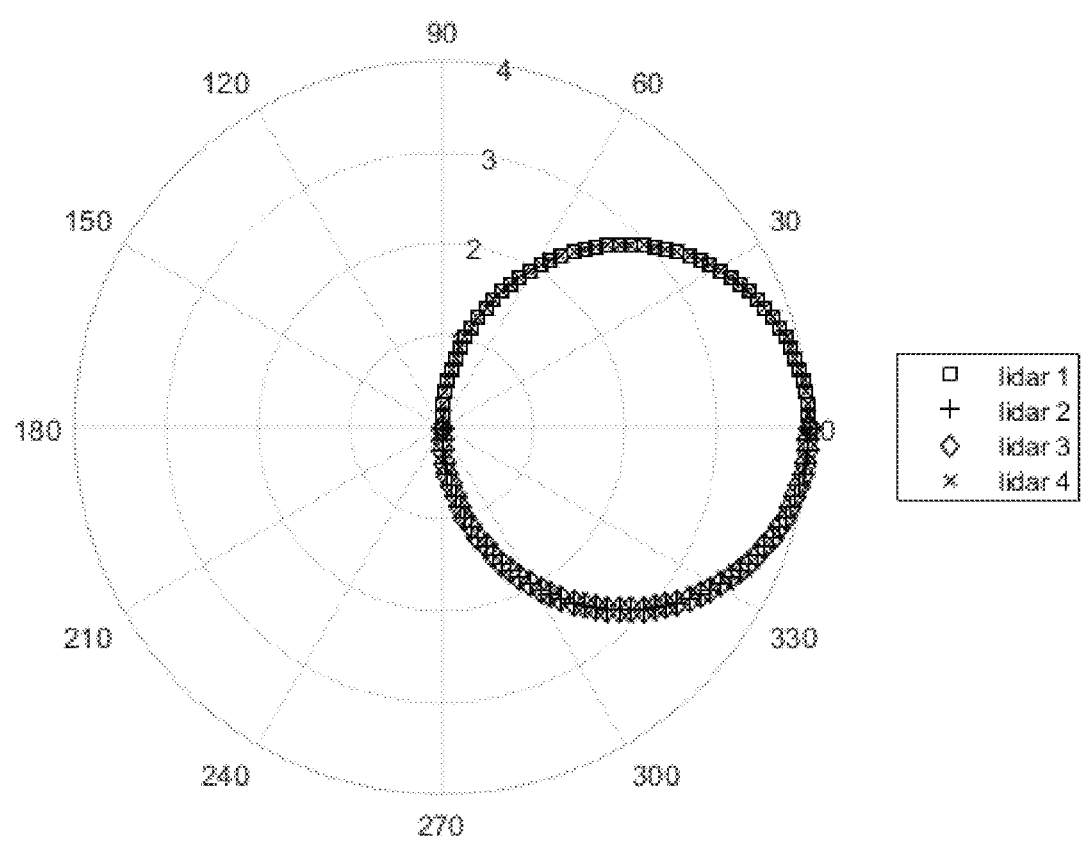
FIG. 28 is an example according to some implementations illustrating a polar plot of Doppler LIDAR measurements versus azimuth angle according to FIG. 26.
Figure 29:
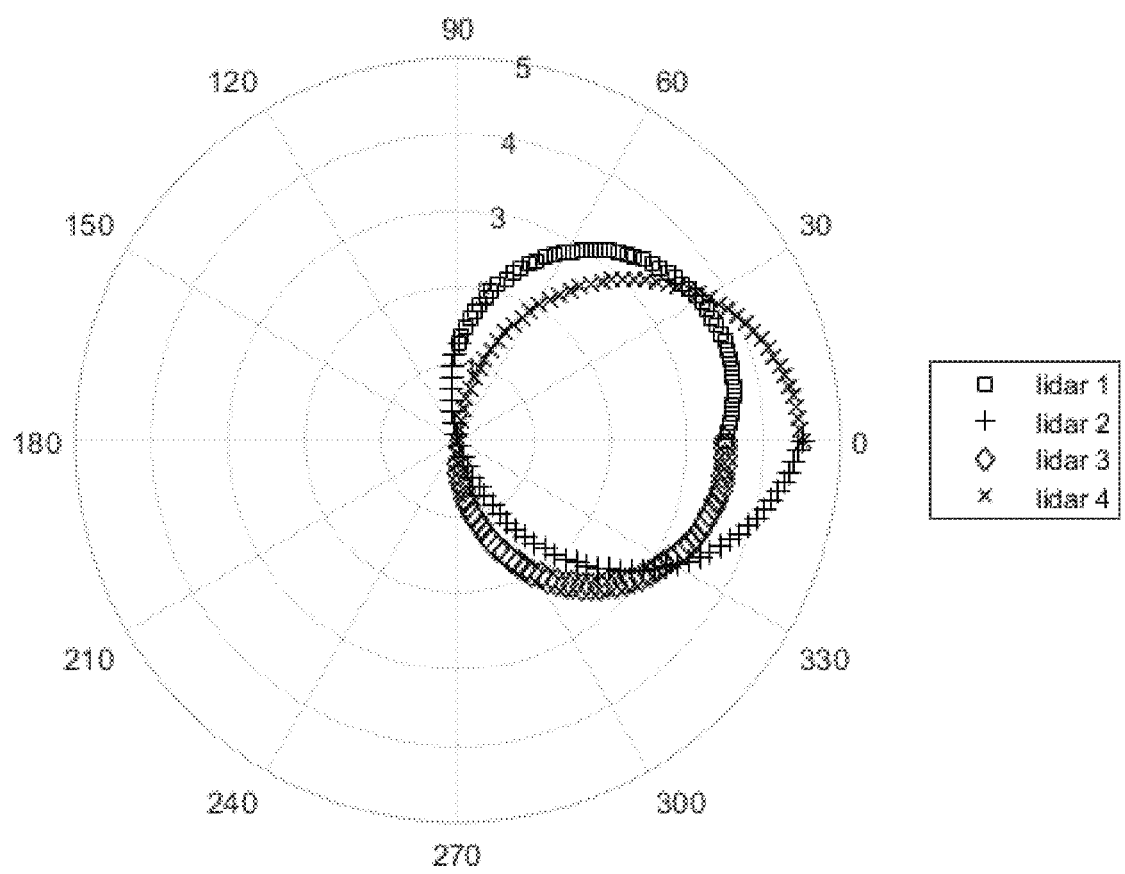
FIG. 29 is an example according to some implementations illustrating a polar plot of Doppler LIDAR measurements versus azimuth angle according to FIG. 27.

FIG. 28 is an example according to various implementations illustrating a polar plot of Doppler LIDAR measurements versus azimuth angle according to FIG. 26. A constant velocity produces a circle on this plot. FIG. 29 is an example according to various implementations illustrating a polar plot of Doppler LIDAR measurements versus azimuth angle according to FIG. 27. Here different circles are observed at each sensor, indicating four different velocities relative to the ground.

5. Computational Hardware Overview

Figure 30:
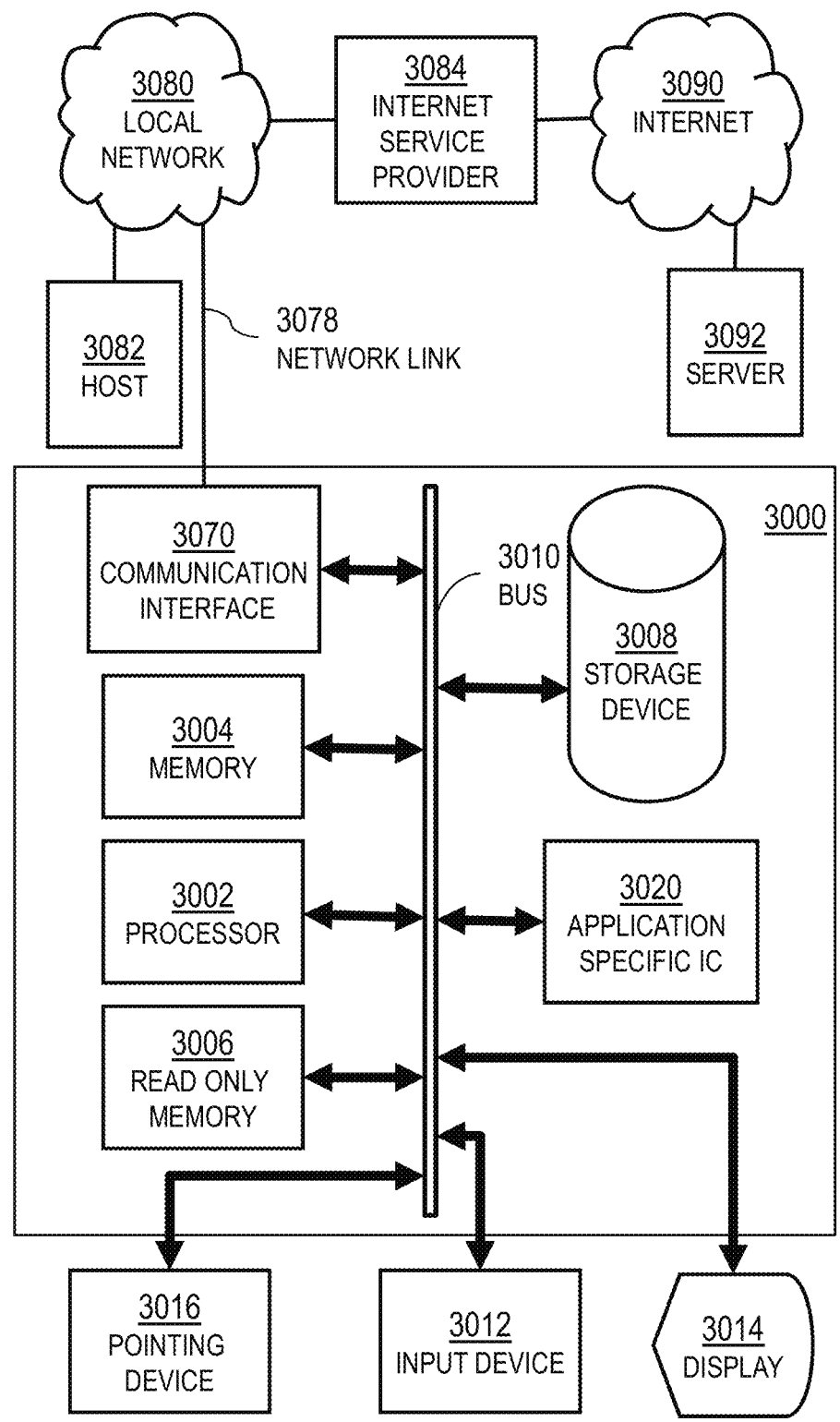
FIG. 30 is a block diagram that illustrates a computer system upon which an implementation of the invention may be implemented.

FIG. 30 is a block diagram that illustrates a computer system 3000 upon which an implementation of the invention may be implemented. Computer system 3000 includes a communication mechanism such as a bus 3010 for passing information between other internal and external components of the computer system 3000. Information is represented as physical signals of a measurable phenomenon, typically electric voltages, but including, in other implementations, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some implementations, information called analog data is represented by a near continuum of measurable values within a particular range. Computer system 3000, or a portion thereof, constitutes a means for performing one or more steps of one or more methods described herein.

A sequence of binary digits constitutes digital data that is used to represent a number or code for a character. A bus 3010 includes many parallel conductors of information so that information is transferred quickly among devices coupled to the bus 3010. One or more processors 3002 for processing information are coupled with the bus 3010. A processor 3002 performs a set of operations on information. The set of operations include bringing information in from the bus 3010 and placing information on the bus 3010. The set of operations also typically include comparing two or more units of information, shifting positions of units of information, and combining two or more units of information, such as by addition or multiplication. A sequence of operations to be executed by the processor 3002 constitutes computer instructions.

Computer system 3000 also includes a memory 3004 coupled to bus 3010. The memory 3004, such as a random-access memory (RAM) or other dynamic storage device, stores information including computer instructions. Dynamic memory allows information stored therein to be changed by the computer system 3000. RAM allows a unit of information stored at a location called a memory address to be stored and retrieved independently of information at neighboring addresses. The memory 3004 is also used by the processor 3002 to store temporary values during execution of computer instructions. The computer system 3000 also includes a read only memory (ROM) 3006 or other static storage device coupled to the bus 3010 for storing static information, including instructions, that is not changed by the computer system 3000. Also coupled to bus 3010 is a non-volatile (persistent) storage device 3008, such as a magnetic disk or optical disk, for storing information, including instructions, that persists even when the computer system 3000 is turned off or otherwise loses power.

Information, including instructions, is provided to the bus 3010 for use by the processor from an external input device 3012, such as a keyboard containing alphanumeric keys operated by a human user, or a sensor. A sensor detects conditions in its vicinity and transforms those detections into signals compatible with the signals used to represent information in computer system 3000. Other external devices coupled to bus 3010, used primarily for interacting with humans, include a display device 3014, such as a cathode ray tube (CRT) or a liquid crystal display (LCD), for presenting images, and a pointing device 3016, such as a mouse or a trackball or cursor direction keys, for controlling a position of a small cursor image presented on the display 3014 and issuing commands associated with graphical elements presented on the display 3014.

In the illustrated implementation, special purpose hardware, such as an application specific integrated circuit (IC) 3020, is coupled to bus 3010. The special purpose hardware is configured to perform operations not performed by processor 3002 quickly enough for special purposes. Examples of application specific ICs include graphics accelerator cards for generating images for display 3014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 3000 also includes one or more instances of a communications interface 3070 coupled to bus 3010. Communication interface 3070 provides a two-way communication coupling to a variety of external devices that operate with their own processors, such as printers, scanners and external disks. In general the coupling is with a network link 3078 that is connected to a local network 3080 to which a variety of external devices with their own processors are connected. For example, communication interface 3070 may be a parallel port or a serial port or a universal serial bus (USB) port on a personal computer. In some implementations, communications interface 3070 is an integrated services digital network (ISDN) card or a digital subscriber line (DSL) card or a telephone modem that provides an information communication connection to a corresponding type of telephone line. In some implementations, a communication interface 3070 is a cable modem that converts signals on bus 3010 into signals for a communication connection over a coaxial cable or into optical signals for a communication connection over a fiber optic cable. As another example, communications interface 3070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 3070 sends and receives electrical, acoustic or electromagnetic signals, including infrared and optical signals that carry information streams, such as digital data.

The term computer-readable medium is used herein to refer to any medium that participates in providing information to processor 3002, including instructions for execution. Such a medium may take many forms, including, but not limited to, non-volatile media, volatile media and transmission media. Non-volatile media include, for example, optical or magnetic disks, such as storage device 3008. Volatile media include, for example, dynamic memory 3004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 3002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 3002, except for carrier waves and other signals.

Logic encoded in one or more tangible media includes one or both of processor instructions on a computer-readable storage media and special purpose hardware, such as ASIC 3020.

Network link 3078 typically provides information communication through one or more networks to other devices that use or process the information. For example, network link 3078 may provide a connection through local network 3080 to a host computer 3082 or to equipment 3084 operated by an Internet Service Provider (ISP). ISP equipment 3084 in turn provides data communication services through the public, world-wide packet-switching communication network of networks now commonly referred to as the Internet 3090. A computer called a server 3092 connected to the Internet provides a service in response to information received over the Internet. For example, server 3092 provides information representing video data for presentation at display 3014.

The invention is related to the use of computer system 3000 for implementing the techniques described herein. According to one implementation of the invention, those techniques are performed by computer system 3000 in response to processor 3002 executing one or more sequences of one or more instructions contained in memory 3004. Such instructions, also called software and program code, may be read into memory 3004 from another computer-readable medium such as storage device 3008. Execution of the sequences of instructions contained in memory 3004 causes processor 3002 to perform the method steps described herein. In alternative implementations, hardware, such as application specific integrated circuit 3020, may be used in place of or in combination with software to implement the invention. Thus, implementations of the invention are not limited to any specific combination of hardware and software.

The signals transmitted over network link 3078 and other networks through communications interface 3070, carry information to and from computer system 3000. Computer system 3000 can send and receive information, including program code, through the networks 3080, 3090 among others, through network link 3078 and communications interface 3070. In an example using the Internet 3090, a server 3092 transmits program code for a particular application, requested by a message sent from computer 3000, through Internet 3090, ISP equipment 3084, local network 3080 and communications interface 3070. The received code may be executed by processor 3002 as it is received, or may be stored in storage device 3008 or other non-volatile storage for later execution, or both. In this manner, computer system 3000 may obtain application program code in the form of a signal on a carrier wave.

Various forms of computer readable media may be involved in carrying one or more sequence of instructions or data or both to processor 3002 for execution. For example, instructions and data may initially be carried on a magnetic disk of a remote computer such as host 3082. The remote computer loads the instructions and data into its dynamic memory and sends the instructions and data over a telephone line using a modem. A modem local to the computer system 3000 receives the instructions and data on a telephone line and uses an infra-red transmitter to convert the instructions and data to a signal on an infra-red a carrier wave serving as the network link 3078. An infrared detector serving as communications interface 3070 receives the instructions and data carried in the infrared signal and places information representing the instructions and data onto bus 3010. Bus 3010 carries the information to memory 3004 from which processor 3002 retrieves and executes the instructions using some of the data sent with the instructions. The instructions and data received in memory 3004 may optionally be stored on storage device 3008, either before or after execution by the processor 3002.

Figure 31:
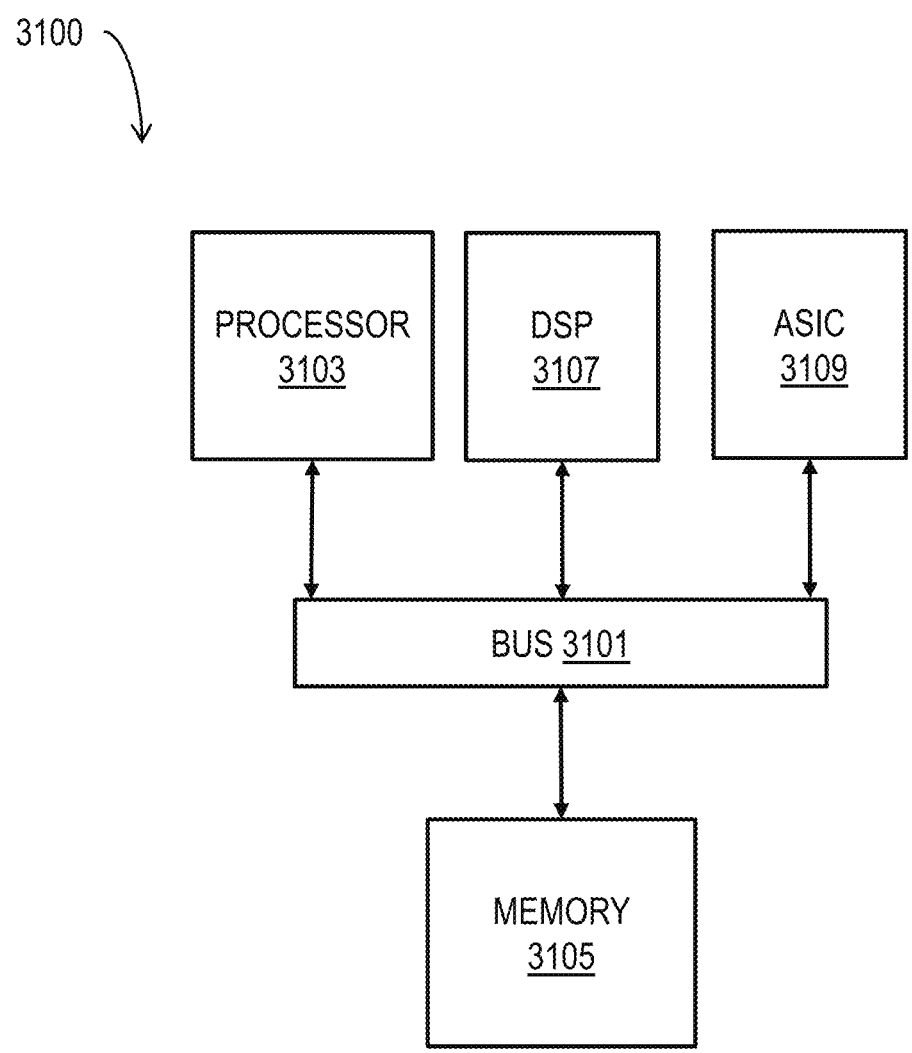
FIG. 31 illustrates a chip set upon which an implementation of the invention may be implemented.

FIG. 31 illustrates a chip set 3100 upon which an implementation of the invention may be implemented. Chip set 3100 is programmed to perform one or more steps of a method described herein and includes, for instance, the processor and memory components described with respect to FIG. 30 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain implementations the chip set can be implemented in a single chip. Chip set 3100, or a portion thereof, constitutes a means for performing one or more steps of a method described herein.

In one implementation, the chip set 3100 includes a communication mechanism such as a bus 3101 for passing information among the components of the chip set 3100. A processor 3103 has connectivity to the bus 3101 to execute instructions and process information stored in, for example, a memory 3105. The processor 3103 may include one or more processing cores with each core configured to perform independently. A multi-core processor enables multiprocessing within a single physical package. Examples of a multi-core processor include two, four, eight, or greater numbers of processing cores. Alternatively or in addition, the processor 3103 may include one or more microprocessors configured in tandem via the bus 3101 to enable independent execution of instructions, pipelining, and multithreading. The processor 3103 may also be accompanied with one or more specialized components to perform certain processing functions and tasks such as one or more digital signal processors (DSP) 3107, or one or more application-specific integrated circuits (ASIC) 3109. A DSP 3107 typically is configured to process real-world signals (e.g., sound) in real time independently of the processor 3103. Similarly, an ASIC 3109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 3103 and accompanying components have connectivity to the memory 3105 via the bus 3101. The memory 3105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 3105 also stores the data associated with or generated by the execution of one or more steps of the methods described herein.

5. Alterations, Extensions and Modifications

In the foregoing specification, the present disclosure has been described with reference to specific implementations thereof. It will, however, be evident that various modifications and changes may be made thereto without departing from the broader spirit and scope of the present disclosure. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various implementations. Thus, a range from 0 to 10 includes the range 1 to 4 in some implementations.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about x" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some implementations of the present disclosure are described below in the context of one or more mounted hi-res phase-encoded Doppler LIDAR systems on a personal automobile; but, implementations are not limited to this context. In other implementations, multiple systems with overlapping or non-overlapping fields of view or one or more such systems mounted on smaller or larger land or sea or air or space vehicles (whether autonomous or semi-autonomous or operator assisted) are employed. In some implementations, the high resolution Doppler LIDAR may, as described in inventors' earlier work, use a continuous wave (CW) laser with external modulation. External modulation provides advantages in enabling waveform flexibility through electronic control, reducing laser requirements (laser is just CW), allowing novel methods for simultaneous range and Doppler (velocity measurement), and allowing better performance at low SNR's when the beam is quickly traversing different speckle realizations. In other implementations, other Doppler LIDAR systems are used, including, for example, direct range Doppler LIDAR, chirped Doppler LIDAR, or lower resolution Doppler LIDAR systems.

What is claimed:

1. A method comprising:
    collecting, by a light detection and ranging (LIDAR) system of a vehicle, point cloud data;
    producing, by the LIDAR system based on the point cloud data, a velocity vector for the vehicle;
    determining, by the LIDAR system, whether a scan by the LIDAR system is unidirectional or bidirectional;
    in response to determining that the scan is bidirectional, revising, by the LIDAR system, the velocity vector and the point cloud data based on an average velocity in a scan direction; and
    in response to determining that the scan is unidirectional, revising, by the LIDAR system, the velocity vector and the point cloud data based on a discontinuity in velocity measurements.

2. The method as recited in claim 1, wherein the revising the velocity vector and the point cloud data based on an average velocity in a scan direction comprises:
    calculating a translational velocity for each scan direction; and
    averaging the calculated translational velocities.

3. The method as recited in claim 2, wherein the translational velocities are averaged across evenly balanced opposing-direction scans such that an erroneous transverse velocity is canceled out.

4. The method as recited in claim 1, wherein the revising the velocity vector and the point cloud data based on a discontinuity in velocity measurements comprises:
    detecting the discontinuity in the velocity measurements at a limit of a field of view (FOV) of a sensor; and
    detecting a transverse velocity at a time of the discontinuity.

5. The method as recited in claim 4, wherein the time of the discontinuity is when a beam wraps around to a far side of the FOV of the sensor.

6. The method as recited in claim 1, wherein the point cloud data comprises data representing at least one of an inclination angle, an azimuthal angle, a range, or a speed.

7. The method as recited in claim 1, wherein the velocity vector is a translation velocity vector.

8. A non-transitory computer-readable storage medium storing instructions which, when executed by one or more processors, cause the one or more processors to perform operations comprising causing a light detection and ranging (LIDAR) system of a vehicle to:

collect point cloud data;

produce, based on the point cloud data, a velocity vector for the vehicle;

determine whether a scan by the LIDAR system is unidirectional or bidirectional;

in response to determining that the scan is bidirectional, revise the velocity vector and the point cloud data based on an average velocity in a scan direction; and in response to determining that the scan is unidirectional, revise the velocity vector and the point cloud data based on a discontinuity in velocity measurements.

9. The non-transitory computer-readable medium as recited in claim 8, wherein in revising the velocity vector and the point cloud data based on an average velocity in a scan direction, the instructions cause the LIDAR system to:

calculate a translational velocity for each scan direction; and average the calculated translational velocities.

10. The non-transitory computer-readable medium as recited in claim 9, wherein the translational velocities are averaged across evenly balanced opposing-direction scans such that an erroneous transverse velocity is canceled out.

11. The non-transitory computer-readable medium as recited in claim 8, wherein in revising the velocity vector and the point cloud data based on a discontinuity in velocity measurements, the instructions cause the LIDAR system to:

detect the discontinuity in the velocity measurements at a limit of a field of view (FOV) of a sensor; and detect a transverse velocity at a time of the discontinuity.

12. The non-transitory computer-readable medium as recited in claim 11, wherein the time of the discontinuity is when a beam wraps around to a far side of the FOV of the sensor.

13. The non-transitory computer-readable medium as recited in claim 8, wherein the point cloud data comprises data representing at least one of an inclination angle, an azimuthal angle, a range, or a speed.

14. The non-transitory computer-readable medium as recited in claim 8, wherein the velocity vector is a translation velocity vector.

15. A light detection and ranging (LIDAR) system comprising:

one or more processors configured to:

collect point cloud data;

produce, based on the point cloud data, a velocity vector for the vehicle;

determine whether a scan by the LIDAR system is unidirectional or bidirectional;

in response to determining that the scan is bidirectional, revise the velocity vector and the point cloud data based on an average velocity in a scan direction; and in response to determining that the scan is unidirectional, revise the velocity vector and the point cloud data based on a discontinuity in velocity measurements.

16. The system as recited in claim 15, wherein in revising the velocity vector and the point cloud data based on an average velocity in a scan direction, the one or more processors are configured to:

calculate a translational velocity for each scan direction; and average the calculated translational velocities.

17. The system as recited in claim 16, wherein the translational velocities are averaged across evenly balanced opposing-direction scans such that an erroneous transverse velocity is canceled out.

18. The system as recited in claim 15, wherein in revising the velocity vector and the point cloud data based on a discontinuity in velocity measurements, the one or more processors are configured to:

detect the discontinuity in the velocity measurements at a limit of a field of view (FOV) of a sensor; and detect a transverse velocity at a time of the discontinuity.

19. The system as recited in claim 18, wherein the time of the discontinuity is when a beam wraps around to a far side of the FOV of the sensor.

20. The system as recited in claim 15, wherein the velocity vector is a translation velocity vector.

\* \* \* \* \*